US012085252B2

(12) United States Patent
Winkler et al.

(10) Patent No.: US 12,085,252 B2
(45) Date of Patent: Sep. 10, 2024

(54) MOTOR VEHICLE

(71) Applicant: Docter Optics SE, Neustadt an der Orla (DE)

(72) Inventors: Markus Winkler, Neustadt an der Orla (DE); Jens Fischer, Neustadt an der Orla (DE); Hagen Schweitzer, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 0 days.

(21) Appl. No.: 18/344,059

(22) Filed: Jun. 29, 2023

(65) Prior Publication Data

US 2024/0011616 A1 Jan. 11, 2024

(30) Foreign Application Priority Data

Jun. 29, 2022 (DE) ..................... 10 2022 116 279.6

(51) Int. Cl.

*F21S 41/663* (2018.01)
*F21S 41/63* (2018.01)
*F21S 41/25* (2018.01)

(52) U.S. Cl.

CPC ........... *F21S 41/663* (2018.01); *F21S 41/635* (2018.01); *F21S 41/25* (2018.01)

(58) Field of Classification Search

CPC .............................. F21S 41/663; F21S 41/635
See application file for complete search history.

(56) References Cited

U.S. PATENT DOCUMENTS

| | | | | |
|---|---|---|---|---|
| 2017/0113599 | A1* | 4/2017 | Park | G06V 20/56 |
| 2017/0138545 | A1* | 5/2017 | Minor | F21K 9/60 |
| 2018/0073700 | A1* | 3/2018 | Orisich | F21S 41/635 |
| 2018/0156409 | A1* | 6/2018 | Schwaiger | F21S 41/675 |
| 2018/0283641 | A1 | 10/2018 | Sanchez et al. | |
| 2019/0049083 | A1* | 2/2019 | Groetsch | F21S 41/18 |
| 2019/0126814 | A1* | 5/2019 | Kay | B62J 6/023 |
| 2019/0197934 | A1* | 6/2019 | El Idrissi | G09G 5/02 |
| 2022/0403998 | A1* | 12/2022 | De Mersseman | F21S 41/143 |

FOREIGN PATENT DOCUMENTS

| | | |
|---|---|---|
| DE | 10 2019 118 981 A1 | 1/2021 |
| DE | 10 2020 119 939 A1 | 2/2022 |

(Continued)

OTHER PUBLICATIONS

Knöchelmann, M. et al., "Aktiver Scheinwerfer mit DMD-Technologie zur Erzeugung vollständiger Lichtverteilungen", VDI-Berichte Nr. 2323, 2018, pp. 61-78.

(Continued)

*Primary Examiner* — Christopher E Dunay
(74) *Attorney, Agent, or Firm* — DUANE MORRIS LLP

(57) ABSTRACT

The disclosure relates, inter alia, to a vehicle headlight (10), for example for a motor vehicle (1), wherein the vehicle headlight (10) comprises an illumination matrix (534) with a plurality of independently controllable illumination pixels for generating a (for example time-variant) illumination pattern, wherein the vehicle headlight (10) comprises an objective for imaging the illumination pattern, and wherein the objective comprises at least one objective lens.

22 Claims, 13 Drawing Sheets

(56) References Cited

FOREIGN PATENT DOCUMENTS

| | | | |
|---|---|---|---|
| DE | 10 2021 101 279 | A1 | 7/2022 |
| WO | 2017/187765 | A1 | 11/2017 |

OTHER PUBLICATIONS

"Audi Matrix LED-Scheinwerfer", https://web.archive.org/web/20150109234745/http://www.audi.de/content/de/brand/de/vorsprung_durch_technik/content/2013/08/Audi-A8-erstrahl, 28.06.22, pp. 1-3.

"ECFR :: 49 CFR 571.118—Standard No. 118; Power-operated window, partition, and roof panel systems", https://www.ecfr.gov/current/title-49/subtitle-B/chapter-V/part-571/subpart-B/section-571.118, Mar. 23, 2022, pp. 1-6.

Huhn, Wolfgang, "Anforderungen an eine adaptive Lichtverteilung für Kraftfahrzeugscheinwerfer im Rahmen der ECE-Regelungen", Herbert Utz Verlag GmbH 1999, pp. 1-151.

Franz-Josef Kalze et al., "LED im Fahrzeug: Die Rolle der Matrixscheinwerfer und was sie leisten", https://www.next-mobility.de/led-im-fahrzeug-die-rolle-der-matrixscheinwerfer-und-was-sie-leisten-a-756004/, Sep. 17, 2018, pp. 1-5.

Alfred Vollmer, "Matrix-LED- und Laserlicht bietet viele Vorteile", https://www.all-electronics.de/automotive-transportation/matrix-led-und-laserlicht-bietet-viele-vorteile.html, Apr. 15, 2014, pp. 1-12.

Sinisa Dohnal, "Mehr Sicherheit und Komfort Mikrolinsen-Array-Technik für projizierte Beleuchtung", https://www.elektroniknet.de/automotive/assistenzsysteme/mikrolinsen-array-technik-fuer-projizierte-beleuchtung.166457/seite-2.html, Jun. 19, 2019, pp. 1-12.

Search Report issued Mar. 25, 2023 for corresponding DE Application No. DE 10 2022 116 279.6.

Wang, Qi, "Piezoaktoren für Anwendungen im Kraftfahrzeug, Messtechnik und Modellierung" Dissertation, Bochum 2006, Schriftenreihe Des Instituts Für Elektronikruhr-Universität Bochum, pp. 1-115.

Dipl.-Ing. Sebastian Söhner, "Entwicklung einer automatisierten Scheinwerfereinstellung mittels aktiver Triangulation", Dissertation, von der Fakultät für Elektrotechnik und Informationstechnikdes Karlsruher Instituts für Technologiegenehmigte, Mar. 6, 2015.

* cited by examiner

MOTOR VEHICLE

PRIORITY CLAIM

This application claims priority to German patent application DE 10 2022 116 279.6, filed Jun. 29, 2023, which is expressly incorporated by reference herein.

FIELD OF THE INVENTION

The disclosure relates to a motor vehicle having a vehicle headlight. The disclosure also relates to a vehicle headlight, for example a motor vehicle headlight, and a method for operating a vehicle headlight. A vehicle headlight within the meaning of the present disclosure relates, for example, to so-called matrix light or adaptive high beam.

BACKGROUND

Examples of matrix light or adaptive high beam can be found at web.ar-chive.org/web/20150109234745/http://www.audi.de/content/de/brand/de/vor-sprung_durch_technik/content/2013/08/Audi-A8-erstrahlt-in-neuem-Licht.html (accessed Sep. 5, 2019), www.all-electronics.de/matrix-led-und-laserlicht-bietet-viele-vor parts/(accessed Sep. 2, 2019), and www.next-mobility.news/led-im-fahrzeug-die-rolle-der-matrixscheinwerfer-und-was-sie-leisten-a-756004/ (accessed Sep. 2, 2019). Alternative light distributions are also disclosed in Wolfgang Huhn: “Anforderungen an eine adaptive Lichtverteilung für Kraftfahrzeugscheinwerfer im Rahmen der ECE-Regelungen” www.utzverlag.de/assets/pdf/31595 all.pdf.

DE 10 2020 119 939 A1 discloses a headlight having a lens arrangement comprising a first lens, a second lens, and a third lens. In addition, the headlight has a light source for outputting light beams through the lens arrangement. The first lens has a first light entrance surface for inputting light beams from the light source into the lens assembly, and a first light exit surface. The second lens has a second light entrance surface and a second light exit surface. The third lens has a third light entrance surface and a third light exit surface for directing light beams out of the lens assembly and into the vicinity of the headlight. In this regard, the first lens, the second lens, and the third lens each have a positive refractive power for converging the light beams.

US 2018/0283641 A1 discloses a device for projecting a light beam with a mechanical actuator, for example for a motor vehicle, comprising a network of light sources capable of emitting light beams to form said light beam along an optical axis, each light source defining a component of said light beam having a resolution angle defined in a plane, said device further comprising a mechanical actuator configured to displace at least one element of the device such that the optical axis of the light beam is displaced between at least two projection directions at a particular displacement frequency, the projection directions forming between them a displacement angle substantially coplanar with the resolution angle, the displacement angle being equal to a fraction of the resolution angle of the beam.

WO 2017/187765 A1 discloses a solid-state light source device provided with a solid-state light emitting element comprising: a substrate having at least one or more solid-state light emitting elements mounted on a surface; the position of the solid-state light emitting element on the substrate moves to another position within the plane parallel to the surface within a predetermined time within the temporal resolving power of the human eye in a predetermined range on the plane, and then returns to the original position; and a movement mechanism for applying movement to repeat the movement back to the substrate, wherein the movement is repeated. The solid-state light source device of the present disclosure may be used, for example, as a vehicle headlight, a video projection device for a vehicle, a light source of a head-up display or a projector, and the like.

DE 10 2021 101 279 A1 discloses an illumination device for a motor vehicle, comprising a plurality of separate light-emitting diodes or an imaging component having an active surface on which imaging elements are arranged in the form of a matrix or an array, the plurality of separate light-emitting diodes or the imaging elements being arranged to generate pixels of a light distribution, an optical system which is arranged to influence the light emanating from the plurality of separate light-emitting diodes or from the active surface in such a manner so that the light distribution is generated in the exterior of the motor vehicle, and a movement device which is arranged to move at least one of the separate light-emitting diodes or at least part of the imaging component or at least part of the optical system from a first position to a second position and from the second position to the first position during operation of the illumination device, at least a plurality of the pixels of the light distribution being arranged at a different location in the light distribution in the first position than in the second position.

DE 10 2019 118 981 A1 discloses an optical device with at least one light source and with at least one spatial modulator for light, wherein the light of the light source impinges on the modulator. Further, the optical device comprises at least one optic arranged in a beam path between the light source and the modulator and preferably adjustable by an actuator. Additionally or alternatively, a position of the modulator may also be adjustable by an actuator and/or the optical device may have at least two optics that are adjustable by an actuator so that they are each insertable and executable in the beam path. By adjusting the modulator and/or the optics and/or by inserting and executing an optic, the light distribution curve of the light of the light source on the modulator can change.

SUMMARY

The disclosure relates, inter alia, to a vehicle headlight comprising, inter alia, an illumination matrix having (a plurality of) independently controllable illumination pixels for generating an illumination pattern (e.g., time-variant), wherein the vehicle headlight may comprise an objective for imaging the illumination pattern, the objective comprising at least one objective lens, wherein the vehicle headlight comprises

- at least one x-oriented actuator for periodically deflecting the illumination matrix and/or the objective and/or a part of the objective and/or an objective lens of the objective in x-orientation, and/or
- at least one y-oriented actuator for periodically deflecting the illumination matrix and/or the objective and/or a part of the objective and/or an objective lens of the objective in y-orientation and/or
- at least one z-oriented actuator for periodically deflecting the illumination matrix and/or the objective and/or a part of the objective and/or an objective lens of the objective in z-orientation.

Here, the z-orientation is an orientation parallel to or along an optical axis of the lens, wherein an x-orientation is oriented orthogonal to the z-orientation or comprises a component oriented orthogonal to the z-orientation, wherein a y-orientation is oriented orthogonal to the z-orientation or comprises a component oriented orthogonal to the z-orientation, wherein the y-orientation is also oriented orthogonal to the x-orientation or comprises a component oriented orthogonal to the z-orientation.

DESCRIPTION OF THE SPECIFIC EMBODIMENTS

Figure 1:
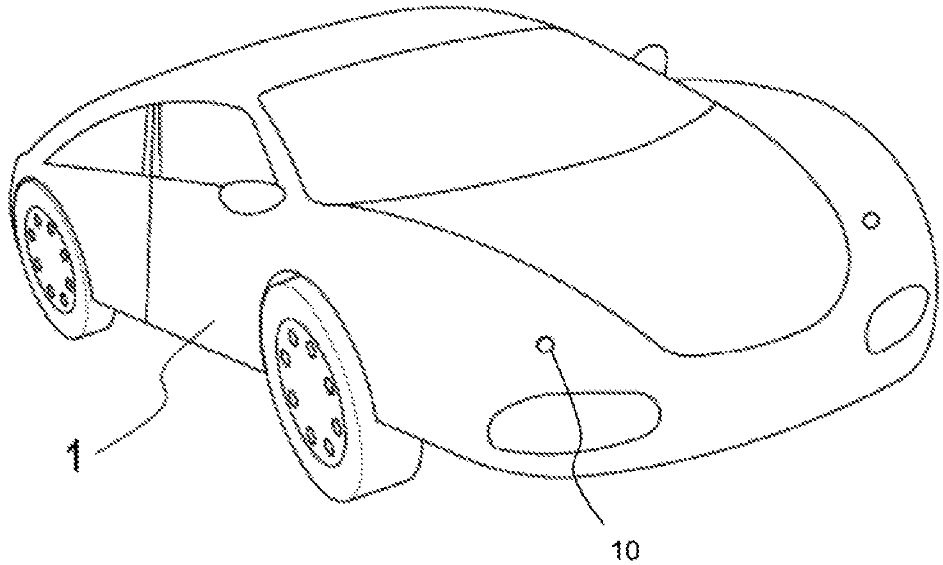
FIG. 1 shows an embodiment example for a motor vehicle with a vehicle headlight.

The disclosure relates, inter alia, to a vehicle headlight comprising, inter alia, an illumination matrix having (a plurality of) independently controllable illumination pixels for generating an illumination pattern (e.g., time-variant), the vehicle headlight being adapted to comprise an objective for imaging the illumination pattern, the objective comprising at least one objective lens, wherein the vehicle headlight comprises

- at least one x-oriented actuator for periodically deflecting the illumination matrix and/or the objective and/or a part of the objective and/or an objective lens of the objective in x-orientation, and/or
- at least one y-oriented actuator for periodically deflecting the illumination matrix and/or the objective and/or a part of the objective and/or an objective lens of the objective in y-orientation and/or
- at least one z-oriented actuator for periodically deflecting the illumination matrix and/or the objective and/or a part of the objective and/or an objective lens of the objective in z-orientation.

Here, the z-orientation is an orientation parallel to or along an optical axis of the lens, wherein an x-orientation is oriented orthogonal to the z-orientation or comprises a component oriented orthogonal to the z-orientation, wherein a y-orientation is oriented orthogonal to the z-orientation or comprises a component oriented orthogonal to the z-orientation, wherein the y-orientation is also oriented orthogonal to the x-orientation or comprises a component oriented orthogonal to the z-orientation.

An illumination matrix in terms of the present disclosure comprises a plurality of independently controllable illumination pixels, for example, not less than 10,000, not less than 100,000, or not less than 1,000,000. In terms of the present disclosure, a first illumination pixel is independently controllable by a second illumination pixel if the first illumination pixel is independently turnable on and off and/or dimmable by the second illumination pixel, and also the second illumination pixel is independently turnable on and off and/or dimmable by the first illumination pixel. An (independently controllable) illumination pixel in the sense of the present disclosure may comprise, for example, an LED, an OLED, or an SSL. An illumination matrix in terms of the present disclosure may comprise, for example, LEDs (light-emitting diodes), OLEDs (organic light-emitting diodes), PLEDs (polymer light-emitting diodes), and/or SSL (solid-state lighting). For example, an illumination pixel as defined in the present disclosure is a separately addressable region. An illumination pixel as defined in the present disclosure is, for example, the smallest unit of a separately controllable area. An illumination pixel in the sense of the present disclosure has, for example, an extension (diagonal or side length or edge length) of at least 20 μm, for example at least 40 μm, for example at least 50 μm. A (light emitting) illumination pixel in terms of the present disclosure has, for example, an extent (diagonal or side length or edge length) of not more than 200 μm, for example not more than 100 μm, for example not more than 50 μm. An illumination matrix in the sense of the present disclosure is, for example, an LED matrix, an OLED matrix, a PLED matrix, an SSL matrix, or an SSL HD matrix.

An actuator within the meaning of this disclosure is, for example, a piezo actuator. Details relating to piezo actuators can be found, for example, in Qi Wang: "Piezoakto-ren für Anwendungen im Kraftfahrzeug, Messtechnik and Modellierung", Dissertation, Ruhr-Universität Bochum 2006.

In the optical system of the vehicle headlight, comprising the illumination matrix, an objective with at least one objective lens and at least one actuator, for imaging a light distribution onto the environment of the vehicle headlight, for example onto the road in front of the motor vehicle in which the vehicle headlight is arranged, at least one reflector and/or a combination of the at least one reflector and at least one lens, for example the at least one lens of the objective, can also be provided. Thereby, the at least one reflector may be oscillatingly moved or deflected in the aforementioned sense in x-orientation, in y-orientation and/or in z-orientation. The reflector or reflectors can thereby be oscillatingly moved or deflected independently of the illumination matrix and/or at least a part of the objective. However, it may also be provided that at least one reflector is moved depending on the illumination matrix and/or the at least one part of the objective.

The vehicle headlight according to the disclosure enables dynamic control of the light distribution (e.g. gradient) by a light source formed as an illumination matrix in combination with the use of actuators on the light source formed as an illumination matrix and/or on an optical element of the beam path, such as a lens and/or a reflector.

It can be provided that the actuator(s) can rotate and/or displace the optical elements (for example a lens and/or a reflector) influencing the beam path of the generated light and/or the light source in one or more spatial directions. It can also be provided that by means of the actuator(s) at least one optical element of the beam path can be reversibly deformed.

The movement of the optical elements (for example a lens and/or a reflector) influencing the beam path of the generated light and/or of the light source formed as an illumination matrix is, for example, an oscillation which can additionally be superimposed with a temporally synchronized change of the brightness of the light source or of parts of the light source. The amplitude of the oscillating movement can be selected, for example, in such a way that any gap between the illumination pixels of the light source (dark area in the image or in the illumination pattern) is reduced or completely covered by the displacement of the image (based on the movement of the optical elements and/or the light source formed as an illumination matrix). Additionally or alternatively, the amplitude of the oscillating movement of the optical elements and/or the light source formed as an illumination matrix can be designed in such a way that illumination pixels of the segmented light source overlap in the generated illumination pattern to such an extent that the failure of an illumination pixel can be compensated for and/or that at least one illumination pixel of the light source appears at different spatially separated locations of the illumination pattern, which corresponds to a virtual increase in the number of illumination pixels.

The amplitude of the respective oscillating movement is selected, for example, so that it corresponds to 0.1 to a maximum of 10 times the individual illumination pixels in the illumination pattern. This allows the resolution of the headlight to be dynamically adjusted. In addition, functions of the vehicle headlight, for example the formation of situation-dependent illumination patterns, can be enabled and/or restricted by software. Furthermore, the failure of at least one illumination pixel in the illumination pattern can thus be suppressed.

The frequency of the respective oscillating motion is selected, for example, so that it is at least 25 Hz, for example at least 40 Hz, for example at least 90 Hz, but not more than 100 Hz.

A gradient within the meaning of this disclosure is, for example, a gradient within the meaning of the technical lighting regulation FMVSS 118 (incorporated by reference in entirety). Details on gradients and their determination can be found in the dissertation "Entwicklung einer automatisierten Schweinwerfereinstellung mittels aktiver Triangulation" of the Faculty of Electrical Engineering and Information Technology of the Karls-ruhe Institute of Technology by Dipl.-Ing. Sebastian Sahner born in Mosbach from 2015 (incorporated by reference in its entirety).

For adjusting a gradient of a bright-dark-boundary by means of oscillating movement of an illumination matrix comprising a plurality of illumination pixels, based on a virtual grid comprising a plurality of virtual grid elements, the intensity of light output of an illumination pixel and/or the switch-on time of the illumination pixel is adjusted depending on the target value of the light intensity assigned to a virtual grid element and the time duration of the spatial overlap of the illumination pixel and the virtual grid element.

Alternatively or additionally, the brightness and/or light intensity of the illumination pixels of the illumination matrix can be dependent on the oscillation of the illumination matrix. This can be associated with a particularly fast switching on and off of the illumination pixels of the illumination matrix.

For purposes of this disclosure, a small gradient is intended to be a gradient in which the light intensity of the imaged illumination pattern transitions from bright to dark over a large range. For the purposes of this disclosure, a comparatively larger gradient is intended to be a gradient in which the light intensity of the imaged illumination pattern transitions from bright to dark in a comparatively smaller range, the transition from bright to dark occurring in extreme cases without a transition region.

In an embodiment, the illumination matrix is connected to an x-oriented actuator and a y-oriented actuator, for example in terms of a rigid coupling or a mechanical coupling or a rigid mechanical coupling. In an embodiment, the or an objective lens is connected to an x-oriented actuator. In an embodiment, the or an objective lens is connected to a y-oriented actuator, for example in the sense of a rigid coupling or a mechanical coupling or a rigid mechanical coupling. In an embodiment, the or an objective lens is connected to a z-oriented actuator, for example in the sense of a rigid coupling or a mechanical coupling or a rigid mechanical coupling.

An example of a motor vehicle has a vehicle headlight as described above. In this context, it is provided, for example, that the motor vehicle comprises an environment sensor system, for example a camera directed at the environment in front of the motor vehicle, for detecting the environment in front of the motor vehicle, the environment sensor system being connected in terms of data technology to the vehicle headlight in such a way that the illumination pattern can be generated as a function of output signals from the environment sensor system.

Figure 14:
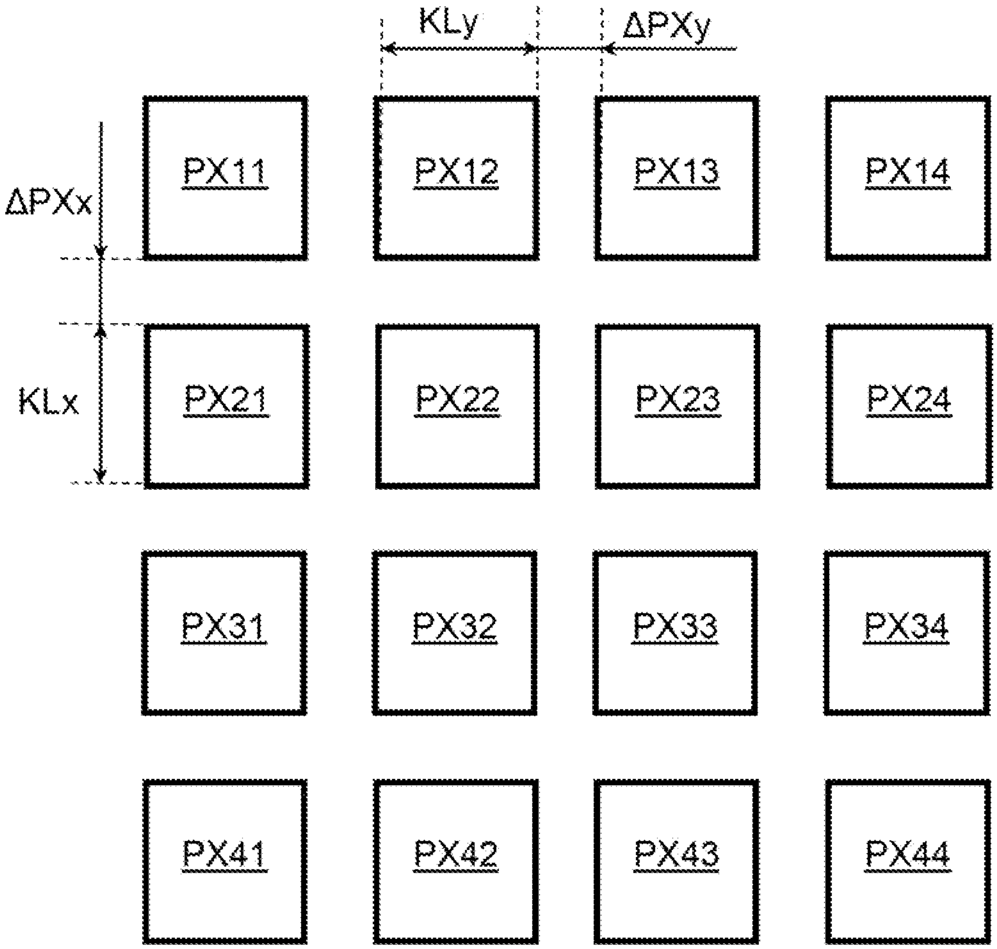
FIG. 14 shows a section of an illumination matrix.

In an embodiment, an x-oriented and/or y-oriented actuator is controlled in such a way that the illumination matrix is moved or deflected periodically in such a way that a distance between two illumination pixels is not perceptible to the human eye. It is provided, for example, that the frequency of the respective deflection is at least 25 Hz. The amplitude is selected, for example, so that it is 0.1 times to a maximum of 10 times the (edge length of the) individual illumination pixels in the image or the illumination pattern. In an exemplary embodiment, the amplitude of the periodic deflection is at least $\Delta PXx/2$ or at least $\Delta PXy/2$, for example at least $\Delta PXx$ or at least $\Delta PXy$. Here, $\Delta PXx$ denotes the or a distance between two illumination pixels in x-orientation and ΔPXy denotes the or a distance between two illumination pixels in y-orientation (see FIG. 14).

In an exemplary embodiment, an x-oriented and/or y-oriented actuator is controlled in such a way that the illumination matrix is moved periodically in such a way that a defective illumination pixel is not perceptible to the human eye. The amplitude of the periodic deflection is at least (KLx+ΔPXx)/2 or at least (KLy+ΔPXy)/2, for example at least (KLx+ΔPXx) or at least (KLy+ΔPXy). Here, KLx denotes the or an edge length of an illumination pixel in x-orientation, KLy denotes the or an edge length of an illumination pixel in y-orientation, ΔPXx denotes the or a distance between two illumination pixels in x-orientation, and ΔPXy denotes the or a distance between two illumination pixels in y-orientation.

The vehicle headlight further comprises an objective having at least one objective lens.

In one embodiment, the or at least one objective lens is (substantially) made of glass or inorganic glass. Inorganic glass or glass within the meaning of this disclosure is, for example, silicate glass. Glass (or inorganic glass) within the meaning of this disclosure is, for example, glass as described in WO 2009/109209 A1. Glass within the meaning of the present disclosure comprises for example 0.2 to 2-wt % $Al_2O_3$,
0.1 to 1 wt.-% $Li_2O$,
0.3, for example 0.4, to 1.5-wt % $Sb_2O_3$,
60 to 75-wt % $SiO_2$,
3 to 12 wt.-% $Na_2O$,
3 to 12 wt.-% $K_2O$ and
3 to 12 wt.-% CaO, such as DOCTAN®.

The or the at least one objective lens may be a press-molded lens. For the purposes of this disclosure, press-molding is to be understood to mean, for example, pressing a (for example optically effective) surface in such a way that subsequent post-processing of the contour of this (for example optically effective) surface can be omitted or is omitted or is not provided. It is thus intended, for example, that a press-molded surface is not ground after the press-molding. Polishing, which does not affect the surface finish but the contour of the surface, may be provided. The press-molding is carried out, for example, in accordance with a process as described in WO 2021/008647 A1. The process described in WO 2021/008647 A1 permits particularly precise press-molding.

In one embodiment, the or at least one objective lens is (substantially) made of plastic. For example, it may be provided that a plastic lens is arranged between two glass lenses.

An edge or a lens edge in the sense of the present disclosure is, for example, three-dimensional. An edge or a lens edge in the sense of this disclosure has, for example, a volume. An edge or a lens edge in the sense of this disclosure comprises, for example, a support shoulder in the direction of the curved surface. It may be provided that the support shoulder is used as a reference or reference surface when grinding the flat surface. It is provided, for example, that the support shoulder is in a fixed relationship to the press-molded surface.

It may be provided that one or more of the (optical or optically effective) surfaces of the at least one objective lens and/or the lens body or the objective lenses and/or the lens bodies, for example the planar or convex curved optically effective surfaces, have a light diffracting structure. The light diffracting structure may be limited to a portion of the surface, for example a central portion of the surface. It is provided, for example, that the light diffracting structure serves for chromatic correction. This means, for example, that color fringes are suppressed and/or reduced by means of the light-diffracting structure.

A or the light entrance surface (of an objective lens) and a or the light exit surface (of an objective lens) in the sense of the present disclosure are, for example, optically effective surfaces. An optically effective surface within the meaning of the present disclosure is, for example, a surface in the intended light path of the headlight or the vehicle headlight or the illumination module.

In one embodiment, at least one objective lens has a light-absorbing lateral surface. In one embodiment, there is a distance—along the optical axis (of the objective lens and/or the vehicle headlight)—between the light entrance surface of the objective lens or the illumination matrix and the light exit surface of the objective lens, the distance being not less than the focal length of the light exit surface of the objective lens and/or not greater than twice the focal length of the light exit surface of the objective lens.

In one embodiment, a motor vehicle comprises an aforementioned vehicle headlight. In one embodiment, the motor vehicle comprises an environment sensor system for detecting the environment in front of the motor vehicle, the environment sensor system being connected in terms of data technology to the vehicle headlight in such a way that the light distribution emitted by means of the vehicle headlight is dependent on the output signals of the environment sensor system. Environment sensor system within the meaning of this disclosure is, for example, a sensor system for detecting driving situations, such as those described in FIGS. 3 and 4. The disclosure also relates to a method for manufacturing a motor vehicle, in which the vehicle headlight is integrated into the motor vehicle for illuminating an area in front of the motor vehicle.

In one embodiment, an illumination pattern configured as a test pattern may also be generated by means of the vehicle headlight. A test image within the meaning of this disclosure can comprise, for example, a sequence and/or a group of partial test images. The individual partial test images differ from one another, for example, in that, at least in part, different illumination pixels emit light (or are controlled accordingly). It is provided, for example, that for each partial test image there is a partial target image with which the partial test image is or can be compared.

The disclosure further relates to a method of operating an aforementioned vehicle headlight and/or operating a aforementioned motor vehicle.

Motor vehicle within the meaning of the disclosure is, for example, a land vehicle that can be used individually on the road. Motor vehicles within the meaning of the disclosure are, for example, not limited to land vehicles with internal combustion engines.

The following numbered clauses include embodiments contemplated and are not limiting:

Clause 1: Vehicle headlight (10), for example for a motor vehicle (1), wherein the vehicle headlight (10) comprises an illumination matrix (216) with a plurality of independently controllable illumination pixels for generating a (for example time-variant) illumination pattern, wherein the vehicle headlight (10) comprises an objective for imaging the illumination pattern, and wherein the objective comprises at least one objective lens, characterized in that the vehicle headlight (10) comprises at least one x-oriented actuator for periodically deflecting the illumination matrix and/or the objective and/or a part of the objective and/or an objective lens of the objective in x-orientation, and/or at least one y-oriented actuator for periodically deflecting the illumination matrix and/or the objective and/or a part of the objective and/or an objective lens of the objective in y-orientation and/or at least one z-oriented actuator for periodically deflecting the illumination matrix and/or the objective and/or a part of the objective and/or an objective lens of the objective in z-orientation, wherein the z-orientation is an orientation parallel to or along an optical axis of the objective, wherein an x-orientation is oriented orthogonal to the z-orientation or comprises a component oriented orthogonal to the z-orientation, wherein a y-orientation is oriented orthogonal to the z-orientation or comprises a component oriented orthogonal to the z-orientation, wherein the y-orientation is further oriented orthogonal to the x-orientation or comprises a component oriented orthogonal to the z-orientation.

Clause 2: Vehicle headlight (10) according to clause 1, characterized in that the illumination matrix (216) is connected to an x-oriented actuator and to a y-oriented actuator.

Clause 3: Illumination lens (46) for a headlight, for example a motor vehicle headlight (10), the illumination lens (46) comprising a lens body (460) of transparent material having at least one light entrance surface (462) and at least one light exit surface, the illumination lens (46) further comprising an illumination arrangement (461) comprising a carrier (4612) on which an illumination matrix (4611) with a plurality of independently controllable illumination pixels is arranged, wherein by means of the illumination matrix (4611) light can be irradiated into the light entrance surface (462) of the lens body (460) which emerges from the light exit surface of the lens body (460), an air gap (464) being provided between the illumination matrix (4611) and the light entrance surface (462) of the lens body (460), the illumination matrix being connected to the lens body via at least one x-oriented actuator for periodically deflecting the illumination matrix and/or the carrier with respect to the lens body, and/or at least one y-oriented actuator for periodically deflecting the illumination matrix and/or the carrier with respect to the lens body.

Clause 4: Illumination lens (46) according to clause 3, characterized in that the air gap (464) is sealed from the environment of the illumination lens (46) in a dust-tight but not air-tight manner.

Clause 5: Illumination lens (46) according to clause 3 or 4, characterized in that the air gap (464) is sealed dust-tight but not air-tight against the environment of the illumination lens (46) by means of a dust filter element (469) or a membrane.

Clause 6: Vehicle headlight (10), characterized in that the lens body (460) of the illumination lens (48) according to clause 3, 4 or 5 comprises, together with at least a first objective lens (42) or with a first objective lens (42) and at least a second objective lens (43), an objective (50B) for imaging light emitted by means of the illumination matrix (4611).

Clause 7: Vehicle headlight (10) according to clause 1, 2 or 6, characterized in that the or an objective lens is connected to an x-oriented actuator.

Clause 8: Vehicle headlight (10) according to clause 1, 2, 6 or 7, characterized in that the or an objective lens is connected to a y-oriented actuator.

Clause 9: Vehicle headlight (10) according to clause 1, 2, 6, 7 or 8, characterized in that the or an objective lens is connected to a z-oriented actuator.

Clause 10: Motor vehicle (1), characterized in that it comprises a vehicle headlight (10) according to a clause 1, 2, 6, 7, 8 or 9.

Clause 11: Motor vehicle (1) according to clause 10, characterized in that the motor vehicle (1) comprises an environment sensor system (2) for detecting signals from the environment of the motor vehicle (1), the environment sensor system (2) being connected in terms of data technology to the vehicle headlight (10) in such a way that the light distribution emitted by means of the vehicle headlight (10) is dependent on output signals from the environment sensor system (2), for example from a camera directed at the environment in front of the motor vehicle.

Clause 12: Method of operating a vehicle headlight according to clause 1, 2, 6, 7, 8 or 9, in which the vehicle headlight is connected to a control system, wherein by means of the control system the illumination matrix and/or at least a part of the objective are periodically deflected in such a way that the vehicle headlight produces a predetermined illumination pattern.

Clause 13: Method for operating a motor vehicle according to clause 10 or 11, in which the motor vehicle has a control system connected to the environment sensor system, wherein, as a function of signals from the environment sensor system, the illumination matrix and/or at least part of the objective are periodically deflected by means of the control system in such a way that the vehicle headlight generates a predetermined illumination pattern.

Clause 14: Method according to clause 12 or 13, characterized in that an x-oriented or y-oriented actuator periodically moves the illumination matrix in such a way that a distance between two illumination pixels is not perceptible to the human eye.

Clause 15: Method according to clause 12, 13 or 14, characterized in that an x-oriented and/or a y-oriented actuator periodically moves the illumination matrix in such a way that a defective illumination pixel is not perceptible to the human eye.

Clause 16: Method according to clauses 12 to 15, characterized in that the intensity of the light power and/or the duration of the light output of an illumination pixel is dependent on a predetermined set value of a gradient as well as the position of the illumination pixel.

Clause 17: Method according to clauses 12 to 16, characterized in that for adjusting the gradient by means of oscillating movement of an illumination matrix comprising a plurality of illumination pixels, based on a virtual grid comprising a plurality of virtual grid elements, the intensity of light output of an illumination pixel and/or the switch-on time of the illumination pixel is adjusted in dependence on the target value of the light intensity of a virtual grid element and the time duration of the spatial overlap of the illumination pixel and the virtual grid element.

Clause 18: Method according to clauses 12 to 17, characterized in that an illumination mode having a first gradient and an information mode having a second gradient are provided, wherein it is possible to switch between the illumination mode and the information mode, wherein the first gradient is smaller than the second gradient, wherein in the information mode information is projected onto the roadway in front of the motor vehicle.

Clause 19: Method of manufacturing a motor vehicle in which a vehicle headlight is manufactured in accordance with clause 1, 2, 6, 7, 8, or 9 and integrated into the motor vehicle for illuminating an area in front of the motor vehicle.

DETAILED DESCRIPTION OF THE DRAWINGS

Figure 2:
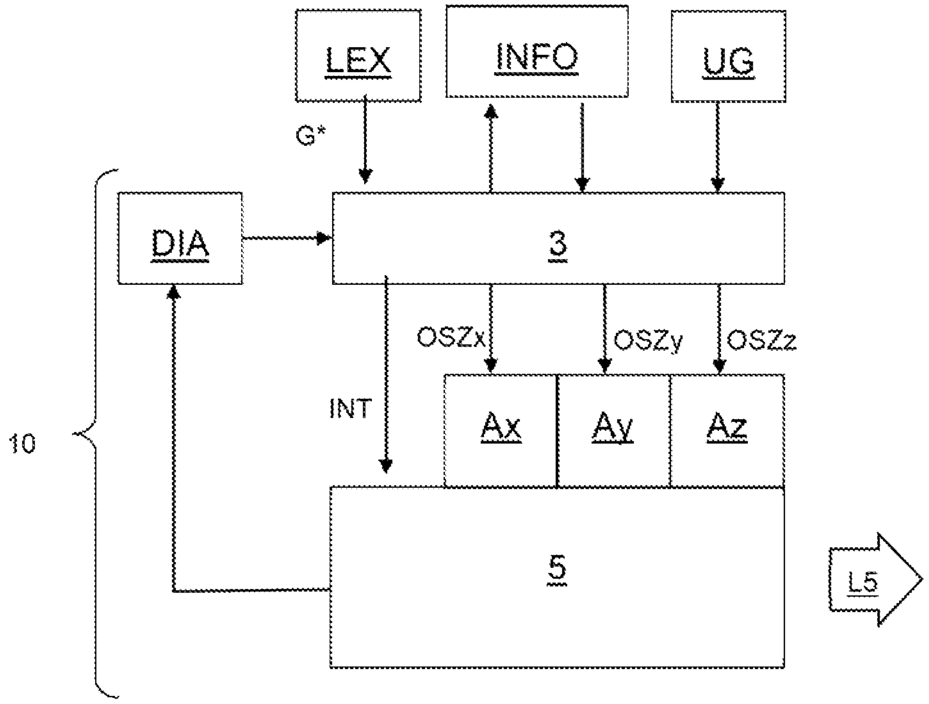
FIG. 2 shows an embodiment example of a vehicle headlight according to FIG. 1 in principle.

FIG. 1 shows a motor vehicle 1 with an adaptive headlight or vehicle headlight 10, shown in more detail in FIG. 2, for situation- or traffic-dependent illumination of the surroundings or the road ahead of the motor vehicle 1 at least as a function of environment sensor system UG. For this purpose, the vehicle headlight 10 has an illumination module 5 shown in more detail in FIG. 5A.

The headlight or vehicle headlight 10 shown schematically in FIG. 2 comprises parts not shown in greater detail, such as housings, fasteners, brackets, which are required for assembling the headlight or vehicle headlight and/or for fastening the headlight or vehicle headlight in the motor vehicle 1.

The headlight or vehicle headlight shown schematically in FIG. 2 comprises a control system 3 and an illumination module 5. The control system 3 provided for the headlight or vehicle headlight may be arranged (at least partially) in the vehicle headlight or (at least partially) outside the headlight or vehicle headlight 10. The control system provided for the headlight or vehicle headlight may also be of modular design and at least partially integrated into a control module of the motor vehicle 1.

Figure 5A:
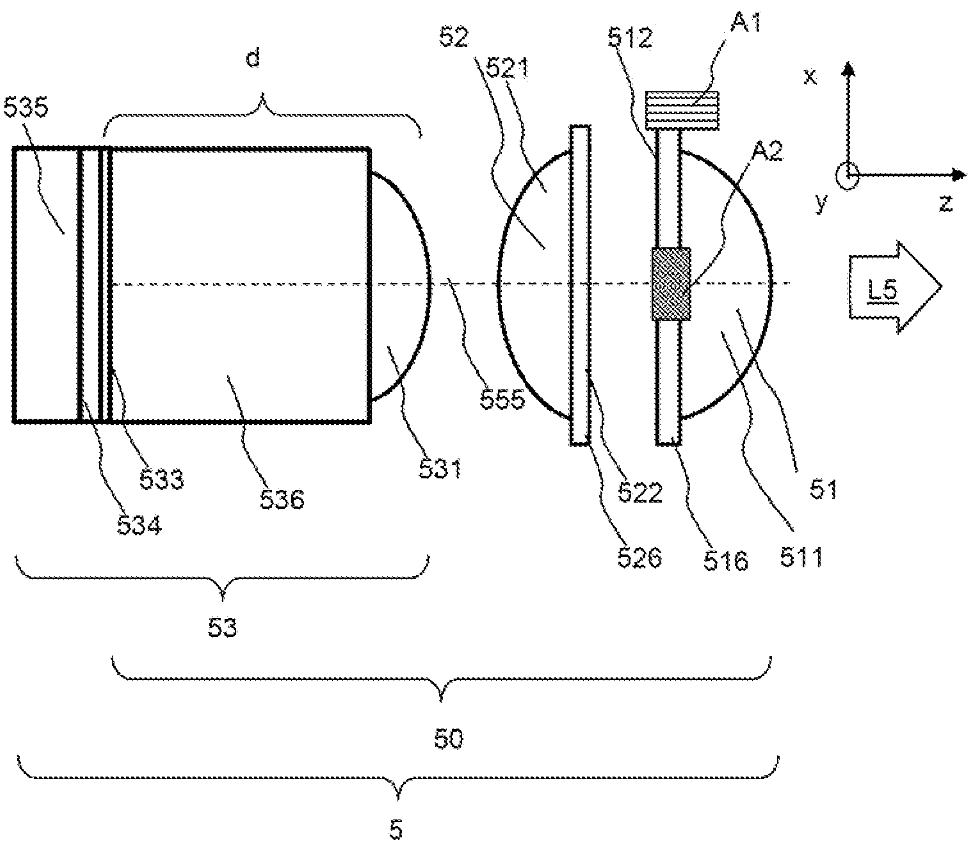
FIG. 5A shows an embodiment example of an illumination module of a vehicle headlight according to FIG. 2.
Figure 5B:
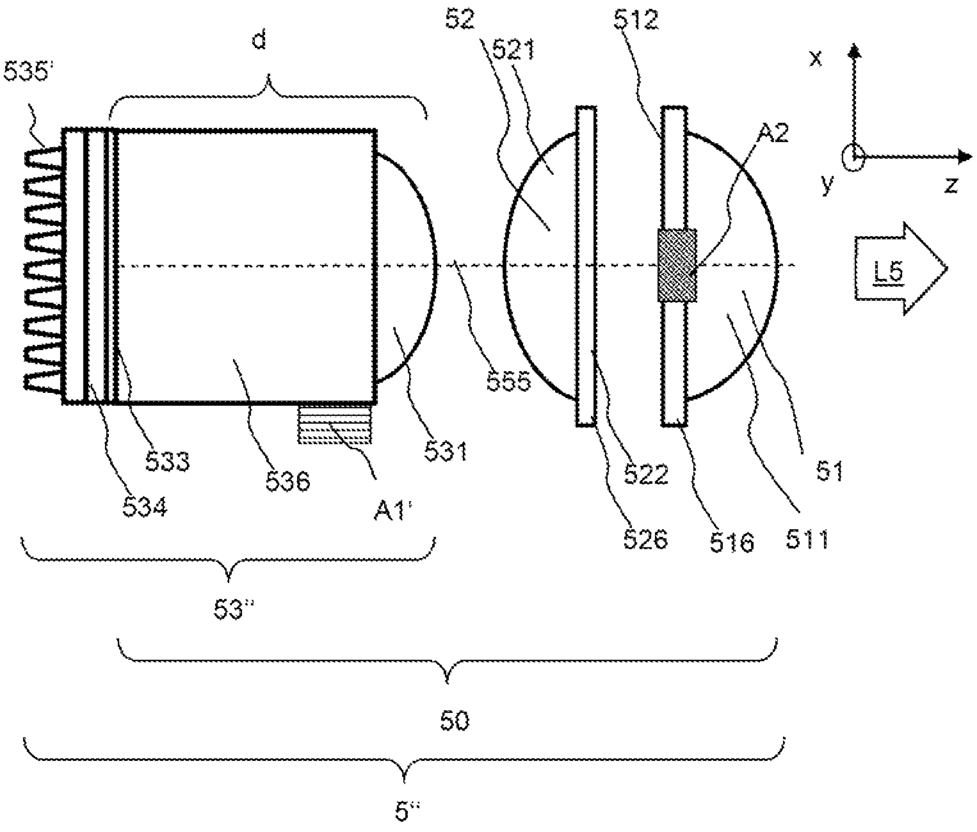
FIG. 5B shows an embodiment example of a further illumination module of a vehicle headlight according to FIG. 2.

With reference to the coordinate system of FIG. 5A, the headlight or vehicle headlight may comprise x-oriented actuators Ax controlled or controllable by control signals OSZx generated by the control system 3, y-oriented actuators Ay controlled or controllable by control signals OSZy generated by the control system 3, and/or z-oriented actuators Az controlled or controllable by control signals OSZz generated by the control system 3.

The illumination module 5 of the vehicle headlight 10 comprises an illumination matrix 534, shown in more detail in FIG. 5A, for generating light that can be formed as an illumination pattern by optical elements in the beam path of the generated light. The illumination matrix 534 comprises illumination pixels.

Depending on the design of the illumination matrix, slow switching (on-off) of the illumination pixels of the illumination matrix to create a quasi-static illumination distribution or fast switching on and off of the illumination pixels of the illumination matrix can be provided, that additionally allows to achieve a soft bright-dark-boundary at the edges or dimmable illumination pixels of the illumination matrix can be provided that also additionally allow to achieve a soft bright-dark-boundary in the illumination pattern. Superimposed on all three variants, an oscillation of the optical elements influencing the beam path of the light can be provided. For the purposes of this disclosure, quasi-static can be a static light distribution, but can also refer, for example, to a light distribution that changes according to the requirements of an adaptive headlight light.

It may be provided that the actuator(s) Ax, Ay, and/or Az can rotate and/or displace the optical elements (for example a lens and/or a reflector) influencing the beam path of the generated light and/or the light source formed as an illumination matrix 534 in one or more spatial directions. It can also be provided that by means of the actuator or actuators Ax, Ay and/or Az at least one optical element of the beam path can be reversibly deformed. In this case, the respective actuators Ax, Ay and/or Az are connected to the respective optical element and/or the illumination matrix 534 in the sense of a rigid coupling or a mechanical coupling or a rigid mechanical coupling.

In addition, it may be provided that by means of the control system 3 the brightness and/or light intensity INT of at least one illumination pixel or of a number of illumination pixels or of the entirety of the illumination pixels of the illumination matrix 534 is adjusted. In this context, the illumination pixels of the illumination matrix 534 may be supplied with power via the control system 3 in such a way that they emit light. Alternatively, however, it may be provided that an alternative power source, not shown in more detail, is provided for the illumination pixels of the illumination matrix 534 to generate light. Alternatively or additionally, the brightness and/or light intensity of the illumination pixels of the illumination matrix may be adjusted by means of the actuators Ax, Ay and/or Az, which cause oscillation of the elements influencing the beam path of the light. This can be done, for example, in a suitable manner in connection with fast switching states (switching on and off of the illumination pixels of the illumination matrix) of the illumination pixels of the illumination matrix.

The vehicle headlight 10 further comprises a diagnostic module DIA for detecting faults in the illumination matrix 534 of the illumination module 5. A fault may be at least one non-light emitting illumination pixel or at least one illumination pixel that does not emit light as required or that emits light incorrectly.

The control system 3 further comprises an interface to a data input LEX, by means of which data for implementing legal requirements are transmitted to the control system 3, such as, for example, the target value G* of a gradient (in relation to the current location of the motor vehicle 1). The control system 3 also comprises at least one interface to an information module or infotainment system INFO, by means of which signals from the infotainment system INFO can also be fed to the control system 3. Finally, the control system 3 also comprises at least one interface to the environment sensor system UG, whereby signals from the environment sensor system UG can be fed to the control system 3.

As a function of signals from the diagnostic module DIA, signals from the data input LEX, signals from the infotainment system INFO and signals from the environment sensor system, the control system 3 controls the actuators Ax, Ay and/or Az in such a way that they move the optical elements of the illumination module connected to them and/or the illumination matrix and/or groups of illumination pixels of the illumination matrix in an oscillating and/or periodic manner in such a way that a situation-dependent illumination pattern is projected onto the roadway in front of the motor vehicle 1. In addition, the control system 3 controls the light intensity (dimming) and/or an on/off state of at least one illumination pixel or a number of illumination pixels or the entirety of illumination pixels to generate a situation-dependent illumination pattern.

The control system 3 is furthermore used to control actuators Ax, Ay, Az in such a way that, for example, the gradient (following, for example, a legal requirement of the data input LEX) of the bright-dark-boundary of the illumination pattern L5 is adjusted. The adjustment may, for example, additionally or alternatively be made with respect to whether it is foggy and, if so, to what extent. The control by means of the control system 3 can also change the gradient of the bright-dark-boundary if information is to be projected onto the road ahead of the motor vehicle.

By means of the control system 3, the vehicle headlight 10 is operated in such a way that a predetermined illumination pattern with a bright-dark-boundary having a gradient is projected onto the surroundings in front of the motor vehicle. The vehicle headlight is in the illumination mode.

It can be provided that (by means of the control system 3), for example depending on the situation, it is changed from the illumination mode to an information mode, in order to then change back to the illumination mode. Here, in the illumination mode, a predefinable illumination pattern L5 is set (by means of the control system 3) with a bright-dark-boundary that has a first gradient, which is projected into the area or into the environment in front of the motor vehicle 1. In the information mode, information is projected onto the roadway in front of the motor vehicle sharply and/or with sufficient contrast.

The change between the illumination mode and the information mode can take place, for example, depending on the situation, in predefinable time durations. During the information mode, the gradient of the bright-dark-boundary can be changed.

Furthermore, a cleaning mode can be provided (by means of the control system 3) in which the optical elements of the illumination module and/or the illumination matrix and/or groups of illumination pixels of the illumination matrix can be moved periodically with a first amplitude and/or a first frequency. The first amplitude and/or the first frequency is thereby higher compared to the second amplitude and/or second frequency selected in the information mode and/or illumination mode. Thereby, the amplitude and/or the frequency in the illumination mode can be selected differently than in the information mode The cleaning mode can be provided, for example, before and/or after switching on (at least one illumination pixel) of the illumination matrix.

Figure 3:
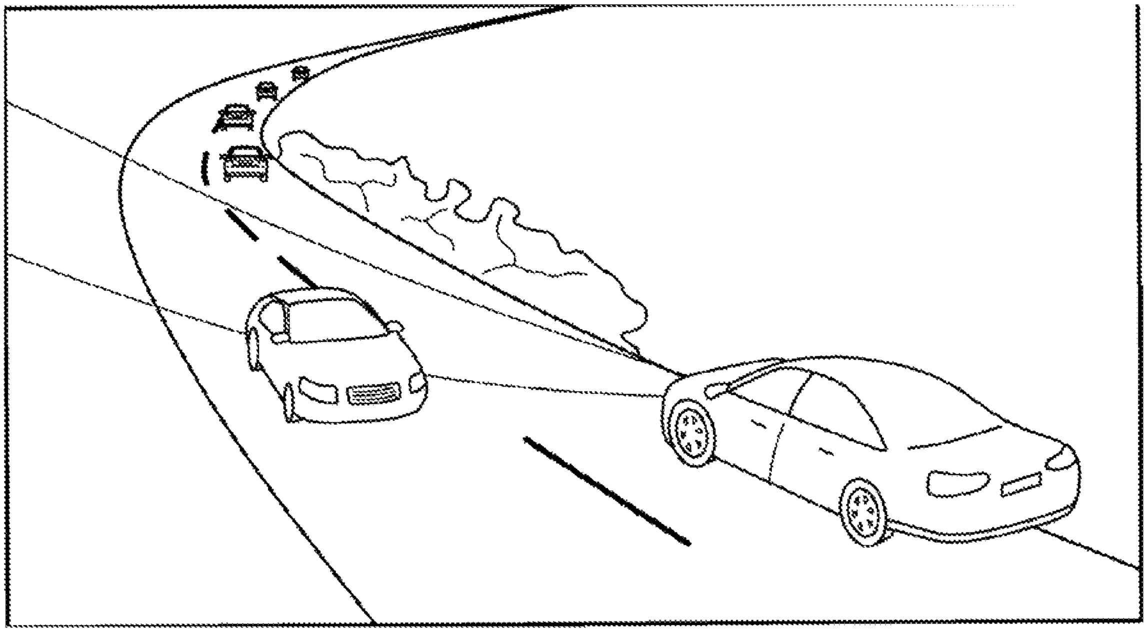
FIG. 3 shows an embodiment example for matrix light or adaptive high beam.

The illumination module 5 with the illumination matrix 534 generates a situation-dependent illumination pattern by means of the control system 3 of the vehicle headlight (in conjunction with an objective 50 shown in FIG. 5A), which is projected as an illumination pattern L5 into the area or into the environment in front of the motor vehicle 1. Examples of corresponding illumination patterns are shown in FIG. 3 and FIG. 4, where FIG. 3 is taken from web.archive.org/web/20150109234745/http://www.audi.de/content/de/brand/de/vorsprung_durch_technik/content/2013/08/Audi-A8-erstrahlt-in-neuem-Licht.html (accessed Sep. 5, 2019) and FIG. 4 is taken from www.all-electronics.de/matrix-led-und-laserlicht-bietet-viele-vorteile/(accessed Sep. 2, 2019).

Figure 4:
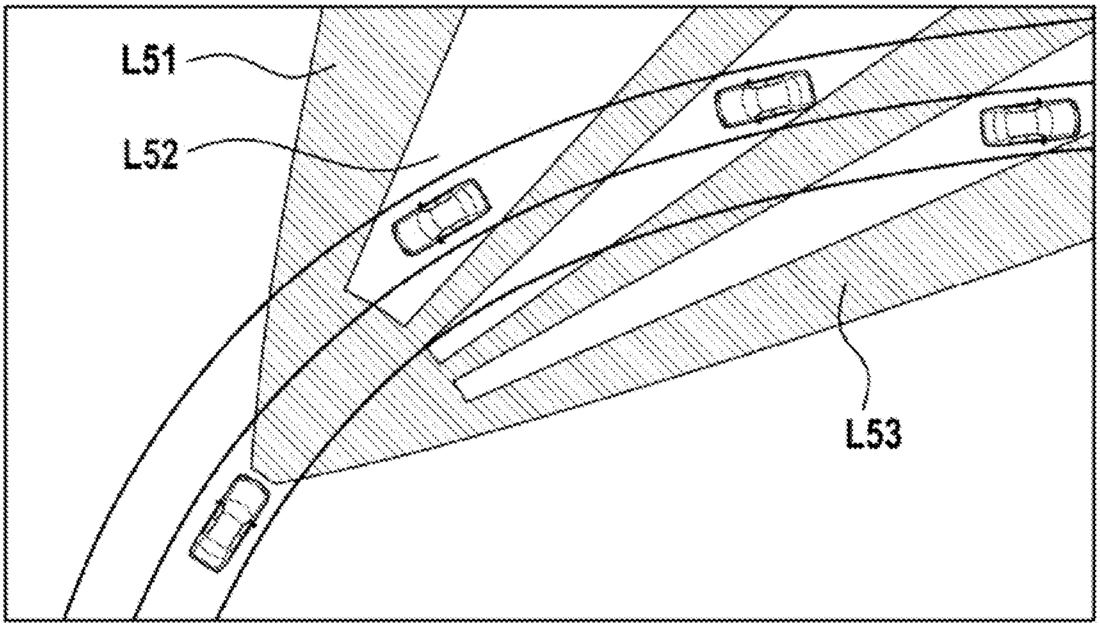
FIG. 4 shows another embodiment example of matrix light or adaptive high beam.

In the embodiment according to FIG. 4, the illumination pattern L5 comprises at least one dazzled area L51, at least one dimmed area L52 and cornering light L53.

Figure 4A:
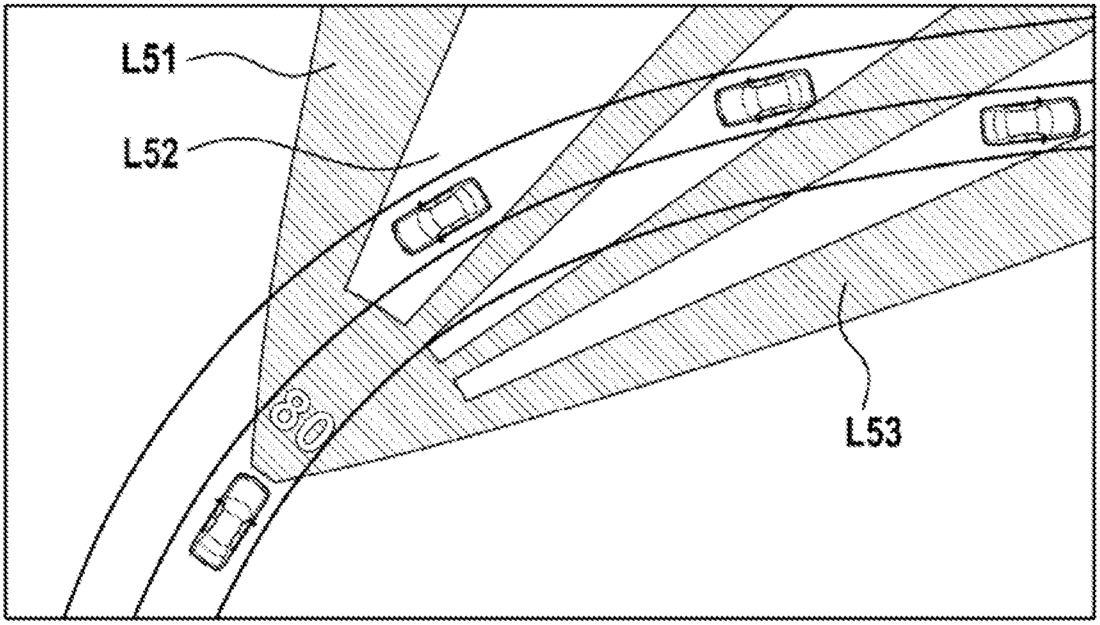
FIG. 4A shows another embodiment example for matrix light or adaptive high beam.
Figure 4B:
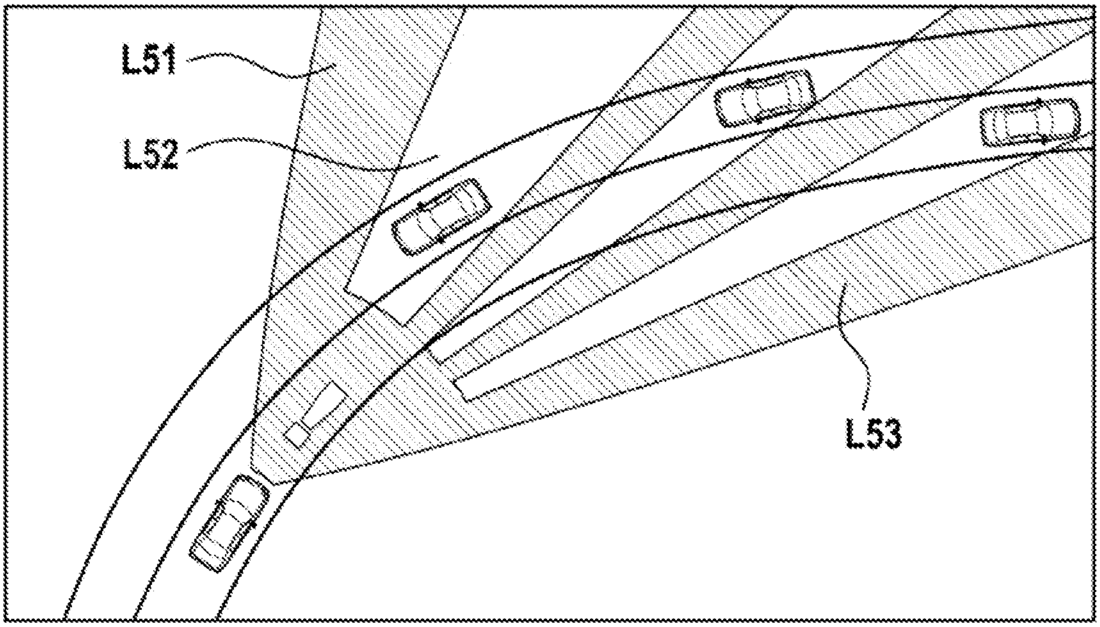
FIG. 4B shows another embodiment example for matrix light or adaptive high beam.

FIG. 4A and FIG. 4B each show a matrix light or adaptive high beam that is alternative or supplementary to the matrix light or adaptive high beam shown in FIG. 4 and that is supplemented by the projection of information onto the road, such as the speed indication "80" in FIG. 4A (which is displayed, for example, when the maximum permissible speed is exceeded) or a warning in the form of a "!" in FIG. 4B.

The light source according to FIG. 5A, which is designed as a (segmented) illumination matrix 534, comprises a plurality of individually adjustable areas or illumination pixels. For example, 10,000 illumination pixels or more may be provided, which are individually controllable (by means of the control system 3) in the sense that they may be individually switched on, switched off and/or dimmed, for example. The vehicle headlight 10 or illumination module 5 further comprises an objective 50 for imaging (light) from the illumination matrix 534 or light emitted by means of the illumination matrix 534. In an embodiment example, the objective 50 comprises a first objective lens 51 made of glass having a press-molded (optically effective) convex curved surface 511, having a ground flat surface 512 opposite the press-molded convex curved surface 511, and having an integrally formed lens edge 516. In the embodiment, the objective further comprises a second objective lens 52 made of glass having a press-molded (optically effective) convex curved surface 521, having a ground flat surface 522 opposite the press-molded convex curved surface 521, and having an integrally formed lens edge 526. In an alternative embodiment, the second objective lens 52 may be made, for example, of plastic, such as plastic having approximately the same refractive index as the glass of the first objective lens 51 of the objective 50, using an injection molding process. The objective 50 may include other objective lenses, not shown in detail, made of glass or plastic or glass and plastic.

The objective 50 further comprises a lens body 536 having a convexly curved optically effective surface 531. The lens body 536, together with an anti-reflection 533, an LED matrix as implementation of a (segmented) light source or illumination matrix 534 (hereinafter also referred to as illumination matrix), and a heat sink 535 for the illumination matrix 534 configured as LED matrix, forms part of an illumination lens 53. In an exemplary embodiment, the distance d along the optical axis 555 of the illumination lens 53 or of the lens body 536 or of the objective 50 is greater than the focal length of the convexly curved optically effective surface 531 of the illumination lens 53 and less than twice the focal length of the convexly curved optically effective surface 531 of the illumination lens 53. It may be provided that the heat sink 535 is part of the illumination module 5, but not part of the illumination lens 53.

Light is generated in the illumination matrix 534 by means of the control system 3. The generated light passes through the lens body 536, exits through optical effective surface 531 of the illumination lens 53, and passes through the second objective lens 52 to reach the first objective lens. The light exits the first objective lens 51 at the convex curved surface 511 to be imaged as an illumination pattern L5 on the roadway and/or in the environment of the motor vehicle.

In the exemplary embodiment according to FIG. 5A, an actuator A1 is provided, by means of which the first objective lens 51 can be deflected or moved in an oscillating manner in orientation x. In the exemplary embodiment according to FIG. 5A, an actuator A2 is also provided, by means of which the first objective lens 51 can be deflected or moved in an oscillating manner in orientation y. Thereby—as shown in FIG. 5A—the orientation z is an orientation which corresponds to the orientation of the optical axis 555. Orientation x is orthogonal to orientation y and orthogonal to orientation z and lies in a substantially vertical plane to optical axis 555. Orientation y is orthogonal to orientation z and orthogonal to orientation x.

By means of the actuators A1 and A2, the objective lens 51 can be deflected in an oscillating manner in orientation x and/or in orientation y in order to image, together with a certain intensity of the illumination pixels of the illumination matrix 534, an illumination pattern on the roadway and/or in the surroundings of the motor vehicle which is predetermined by the control system 3.

In an alternative embodiment of an illumination module 5" as a modification of the illumination module 5, an actuator A1' for deflecting the illumination lens 53" is provided instead of the actuator A1. By moving the illumination lens 53" by means of the actuator A1', a smaller dimensioned heat sink 535' can be used instead of the heat sink 535.

For example, a heat sink within the meaning of the present disclosure has cooling fins.

Figure 6:
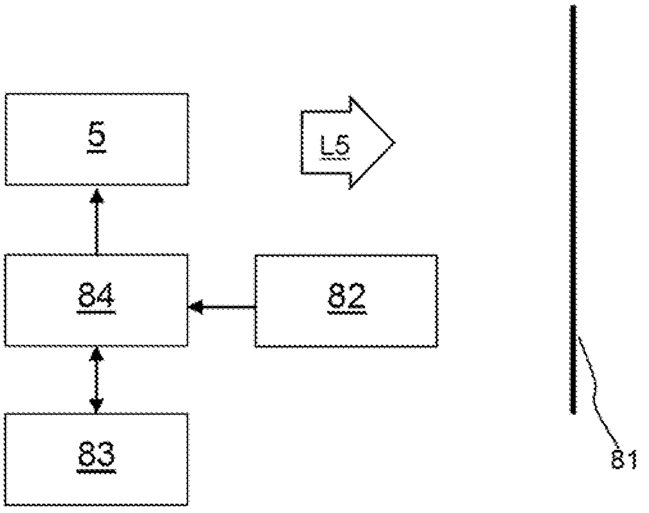
FIG. 6 shows an embodiment example of a method for calibrating an illumination module according to FIG. 5A and a vehicle headlight according to FIG. 2, respectively

In the course of manufacturing the aforementioned headlight or vehicle headlight 10 or the illumination module 5, the actuators A1 and A2 are calibrated by projecting a test image onto a reference surface 81 as shown in FIG. 6 by means of the illumination module 5 or by means of the objective 50. The pattern for controlling the illumination module 5 can be stored together with a corresponding target image or a target gradient in a database 83 and can be read out by a test module 84. The test module 84 controls the illumination module 5 accordingly. A camera 82 may be provided that captures the test image and supplies a corresponding output signal to the test module 84. The test module 84 compares the test image and the target image and/or a gradient determined from the test image with a target gradient. Instead of the camera 82 and the corresponding sub-functionality of the test module 84, an operator may also perform the matching. The actuators A1 and A2 are calibrated until the test image corresponds (at least within a permissible tolerance range) to the corresponding target image.

Figure 7A:
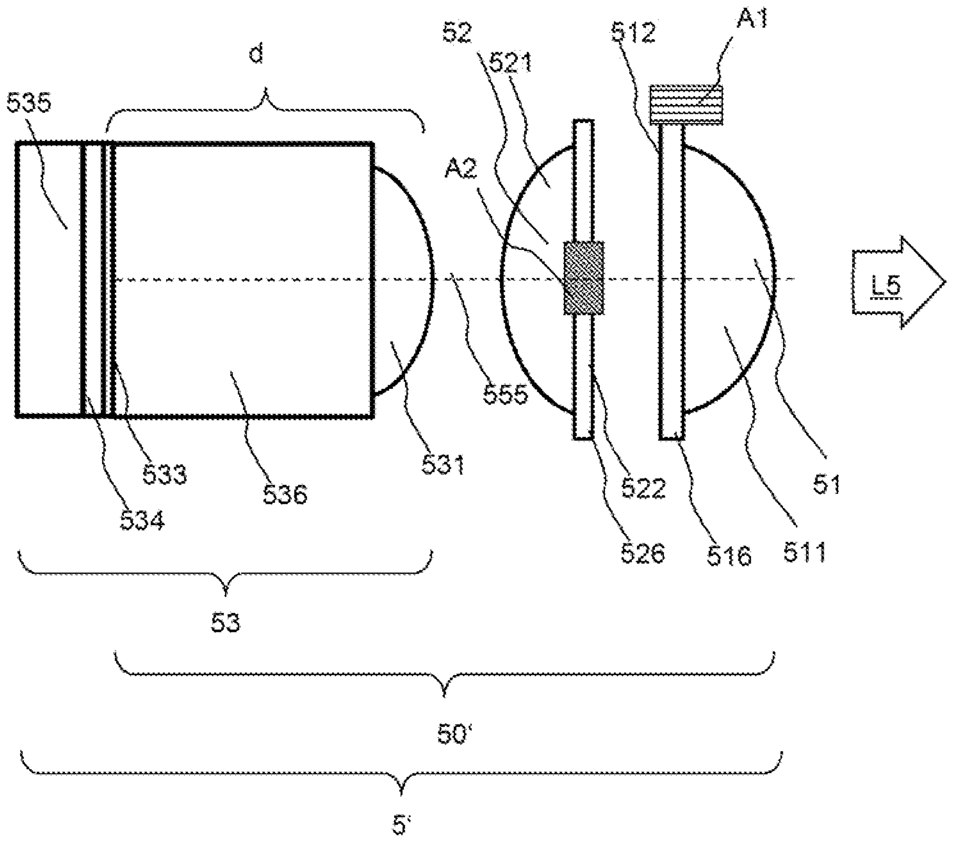
FIG. 7A shows an embodiment example of an illumination module designed as an alternative to the illumination module according to FIG. 5A.
Figure 7B:
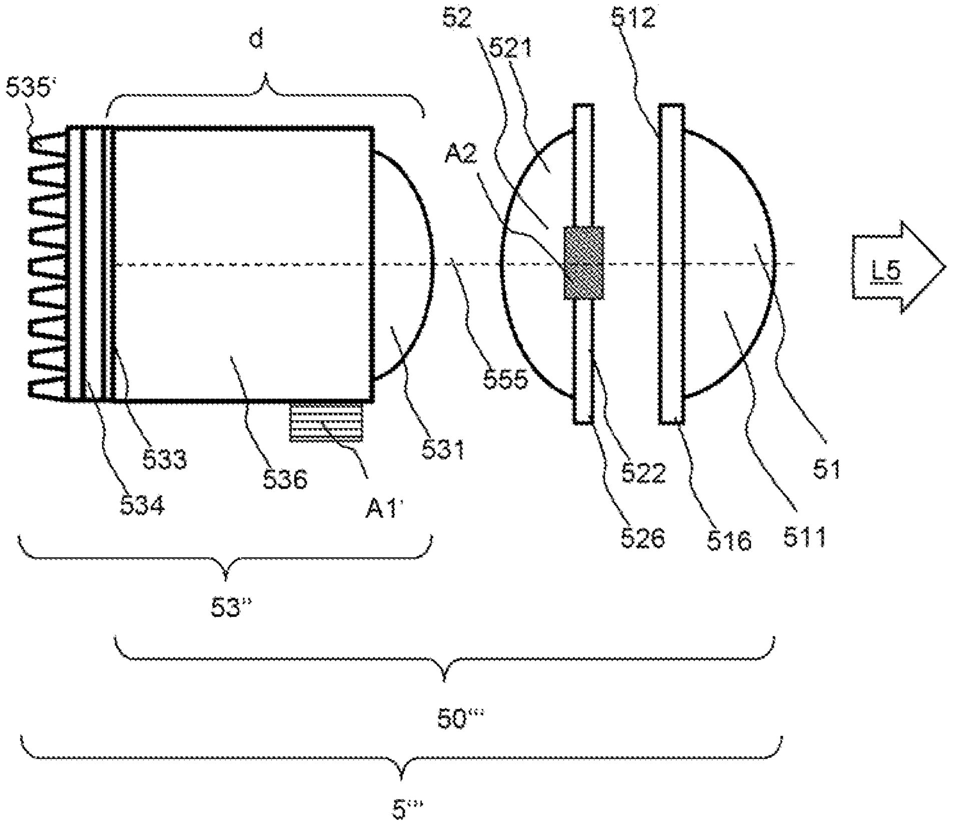
FIG. 7B shows an embodiment example of an illumination module designed as an alternative to the illumination module according to FIG. 7A.

FIG. 7A shows an illumination module 5' modified compared to the illumination module 5 (with an objective 50' modified compared to the objective 50). Here, the actuator A2 is arranged in such a way that it moves the second objective lens 52 in an oscillating manner in the orientation y.

In an alternative embodiment of an illumination module 5''' as a modification of the illumination module 5', an actuator A1' for deflecting the illumination lens 53" is provided instead of the actuator A1. By moving the illumination lens 53" by means of the actuator A1', a smaller dimensioned heat sink 535' can be used instead of the heat sink 535.

Figure 8:
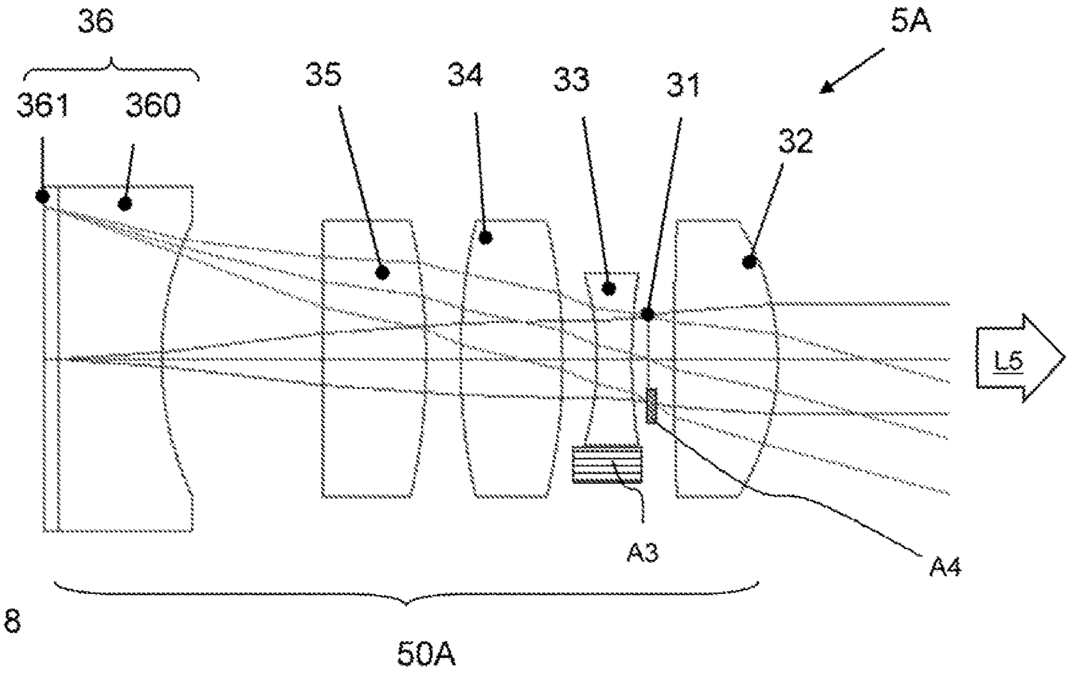
FIG. 8 shows an embodiment example of another alternative illumination module for use instead of the illumination module according to FIG. 5A or the illumination module according to FIG. 7A.

FIG. 8 shows another alternative embodiment of an illumination module 5A (having an objective 50A) for use in place of the illumination module 5. The illumination module 5A has an objective 50A comprising a plurality of objective lenses 32, 33, 34, 35 and a lens body 360. The objective 50 A has an objective lens 32 on the light exit side. An objective lens 33 is disposed behind the objective lens 32 as viewed from the light exit side. A diaphragm is arranged between the objective lens 32 and the objective lens 33, the opening of which is designated by reference numeral 31. An objective lens 34 is arranged behind the objective lens 33. An objective lens 35 is arranged behind the objective lens 34, and an illumination lens 36 is arranged behind the objective lens 35, which comprises a lens body 360 and an illumination arrangement 361 on the side of the lens body 360 facing away from the light exit direction. The illumination arrangement 361 may be a light source corresponding to the illumination matrix 534 alternatively, however, may be constructed from a plurality of OLEDs and/or PLEDs and/or SSLs. Associated with the illumination module 5A and/or the objective 50A is a heat sink, which is not shown in detail and may be configured like the heat sink 535. In addition, the lens body 360 may have an anti-reflection corresponding to the anti-reflection 533 shown in FIG. 5A. Alternatively, the objective 50A may have more than 4 or less than 4 objective lenses. The objective lenses and/or the lens body may be made of glass or plastic or glass and plastic.

In the objective 50A, it is provided that the objective lens 33 is moved oscillatingly in orientation x or in orientation z by means of an actuator A3. It is also provided that the opening 31 of the diaphragm is moved in an oscillating manner in orientation y or in orientation z by means of an actuator A4. Alternatively or additionally, the opening 31 of the diaphragm can be deformable by means of the actuator A4.

Figure 9:
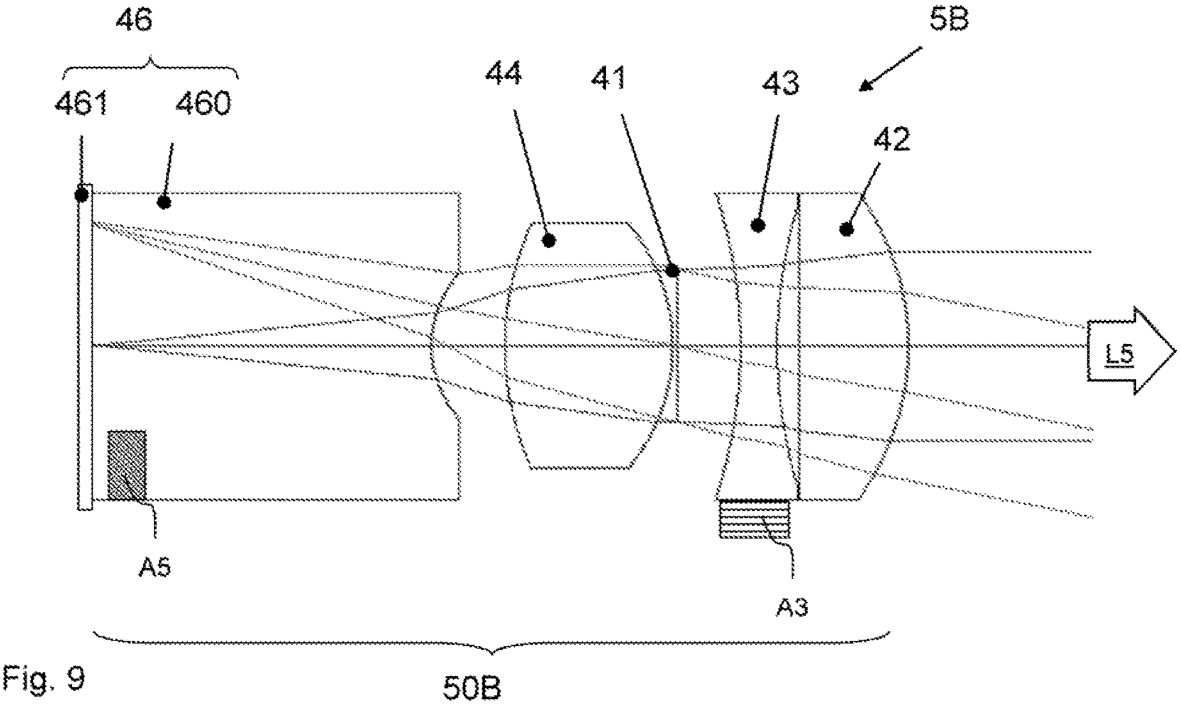
FIG. 9 shows an embodiment example of another alternative illumination module for use instead of the illumination module according to FIG. 5A or the illumination module according to FIG. 7A.

FIG. 9 shows, as another alternative embodiment, an illumination module 5B for use in place of the illumination module 5 or in place of the illumination module 5' or in place of the illumination module 5A. The illumination module 5B has an objective 50B that comprises a plurality of objective lenses 42, 43, 44 and a lens body 460. The objective 50B has an objective lens 42 on the light exit side. An objective lens 43 is disposed behind the objective lens 42 as viewed from the light exit side. An objective lens 44 is arranged behind the objective lens 43. A diaphragm is arranged between the objective lens 43 and the objective lens 44, the opening of which is designated by reference sign 41. An illumination lens 46 is arranged behind the objective lens 44, which comprises a lens body 460 and an illumination arrangement 461 on the side of the lens body 460 facing away from the light exit direction. The illumination arrangement 461 may be a light source corresponding to the illumination matrix 534 alternatively, however, may be constructed from a plurality of OLEDs and/or PLEDs and/or SSLs. Associated with the illumination module 5B and/or the objective 50B is a heat sink not shown in detail, which may be configured like the heat sink 535. In addition, the lens body 460 may have an anti-reflection corresponding to the anti-reflection 533 shown in FIG. 5A. Alternatively, the objective 50B may have more than 3 or less than 3 objective lenses. The objective lenses and/or the lens body may be made of glass or plastic or glass and plastic.

In the objective 50B, it is provided that the lens 43 is oscillatingly moved in orientation x or in orientation z by means of an actuator A3. Furthermore, in a modification, it is provided that the lens body 460 is oscillatingly moved in orientation y by means of an actuator A5. Due to the oscillating movement of the actuator A5, the heat sink provided for the light source, which is not shown in more detail, can be designed for a comparatively lower cooling power.

Figure 10:
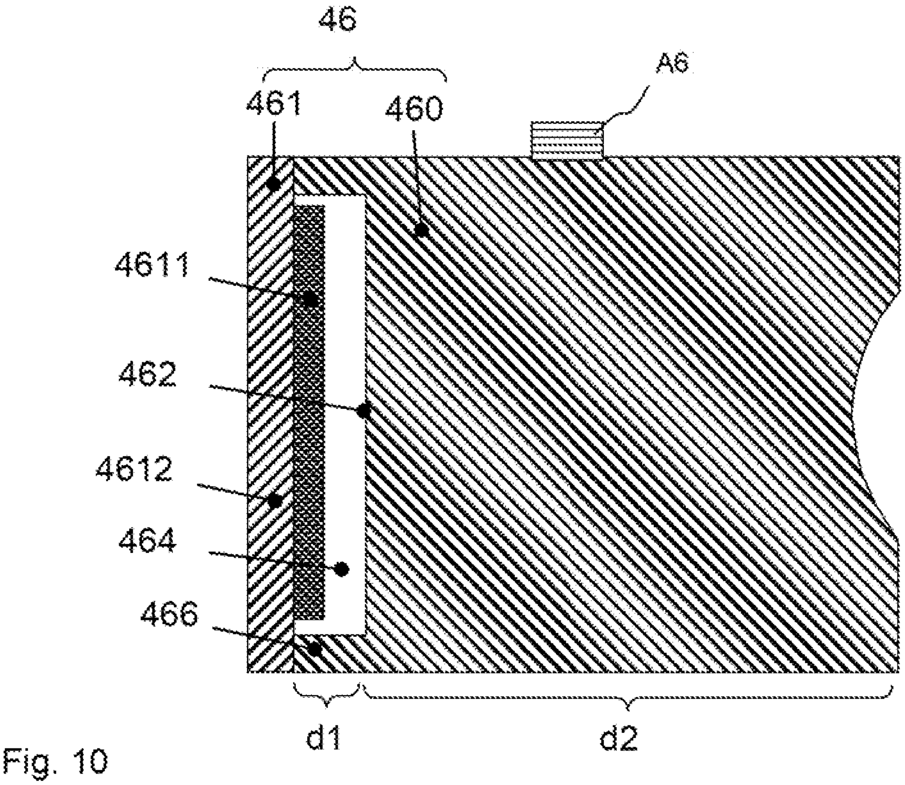
FIG. 10 shows a cross-sectional view of an illumination lens for use with an illumination module according to FIG. 8, an illumination module according to FIG. 7A, and a modification of the illumination module according to FIG. 5A.

In an alternative embodiment, it is provided that the light source of an illumination matrix 534 or of an illumination arrangement 361 or of an illumination arrangement 461, which is designed as an illumination matrix, is not directly connected to the respective lens body 360, 460 or 536, but is arranged at a small distance (air gap) from it. A possible embodiment example is shown in FIG. 10 in modification to the embodiment example of an illumination module 5B according to FIG. 9 representative of corresponding variations of the illumination modules 5, 5' or 5A.

In this regard, the illumination lens 46 has an illumination arrangement 461 and a lens body 460 with a protruding lens edge 466. It is provided, for example, that the lens body 460 is press-molded. In this regard, it may be provided, for example, that the distance d1 along an optical axis corresponding to the optical axis 555 shown in FIG. 5A, which denotes the extension of the lens edge 466 of the lens body 460, is not subject to tolerance with respect to variations of a blank that is press-molded to obtain the lens body 460.

Volume variations of a corresponding blank for press-molding the lens body 460 are provided as a tolerance or variation in distance d2.

Further, the illumination arrangement 461 may include a carrier 4612 on which an illumination matrix 4611 is disposed. In this case, the illumination matrix 4611 has been fabricated on the carrier 4612. Subsequently, the carrier 4612 is connected to the protruding edge 466 of the lens body 460, e.g. glued. Thereby, a small air gap 464 is provided between the carrier 4612 or the illumination matrix 4611 and the light entrance surface 462 of the lens body 460. The size of the air gap 464 corresponds essentially to the distance d1 reduced by the extent of the illumination matrix 4611. It is provided that the illumination lens 46 or the lens body 460 is moved in an oscillating manner in orientation x by means of an actuator A6. In addition, it can be provided that the illumination lens 46 or the lens body 460 is moved oscillatingly in orientation y by means of an actuator A7.

Figure 11:
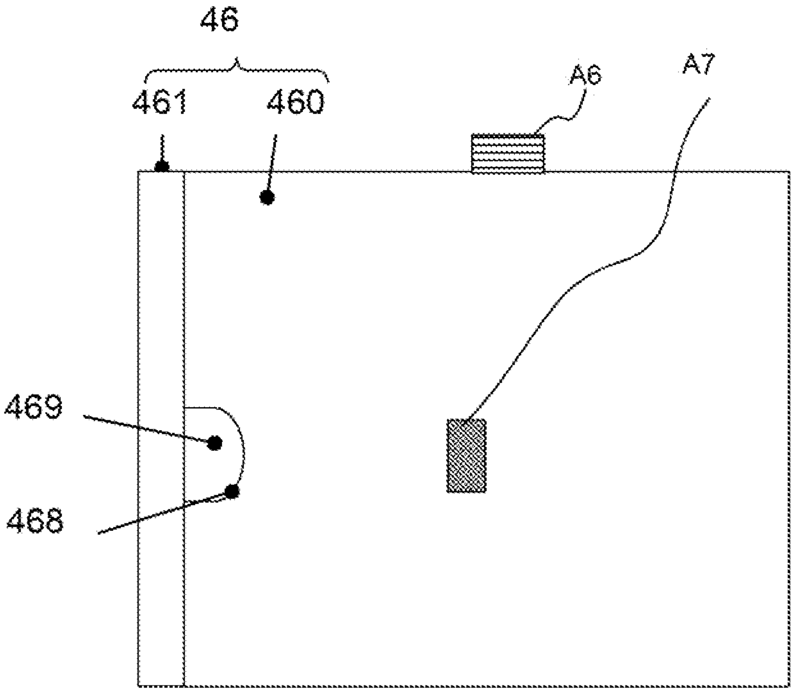
FIG. 11 shows an external view of the illumination lens according to FIG. 10.

FIG. 11 shows the illumination lens 46 in a side view. Here, reference numeral 468 denotes a recess in the lens edge 466. A dust filter element 469 is arranged in this recess, which allows gas exchange between the air gap 464 and the surroundings of the illumination lens 46, but does not allow dust particles to enter the air gap 464. A corresponding filter may be, for example, a membrane or a ceramic filter.

Figure 12:
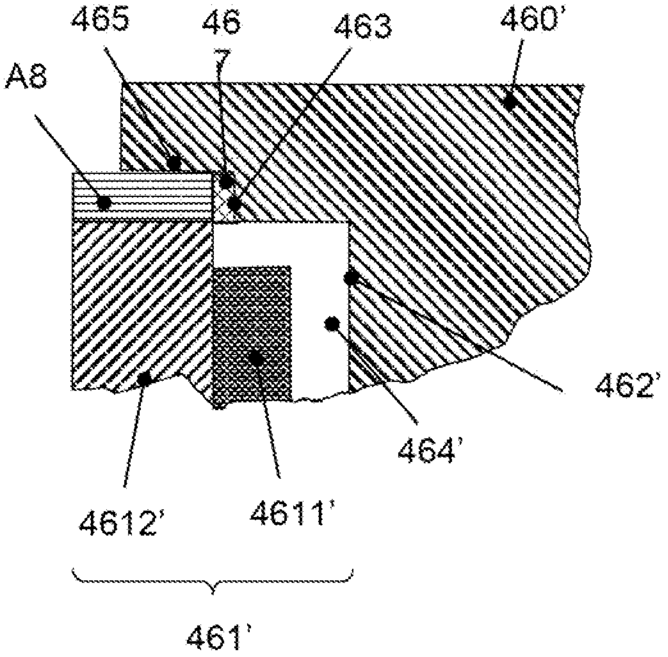
FIG. 12 shows a modification of the illumination lens according to FIG. 10.

FIG. 12 shows a modified embodiment of an illumination lens 46' for replacing the illumination lens 46 according to FIG. 10 and FIG. 11. Here, a carrier 4612' is provided on which an illumination matrix 4611' is arranged. The carrier 4612' and the illumination matrix 4611' together with an actuator A8 form an illumination arrangement 461'. It is provided that the carrier 4612' and thus the illumination matrix 4611' are moved in an oscillating manner in orientation x by means of the actuator A8. The carrier 4612' can be designed as a heat sink and/or comprise a heat sink. Due to the oscillating movement of the actuator A8, the heat sink of the carrier 4612', which is not shown in more detail, can be designed for a comparatively lower cooling power.

In a further modification to the embodiment according to FIG. 10, a lens body 460' according to FIG. 11 has a lens edge 466' that is modified from the lens edge 466 of the lens body 460 in that it has a step in the interior formed by a support shoulder 463 and a centering surface 465. A seal 467 is provided on the support shoulder 463, on which the carrier 4612' rests on the support shoulder 463. An air gap 464' is provided between the light entrance surface of the lens body 460', designated by reference numeral 462', and the illumination matrix 4611'. This air gap 464' has a recess corresponding to the recess 468 according to FIG. 10, which is sealed by means of a dust filter element corresponding to the dust filter element 469 according to FIG. 11.

Figure 13:
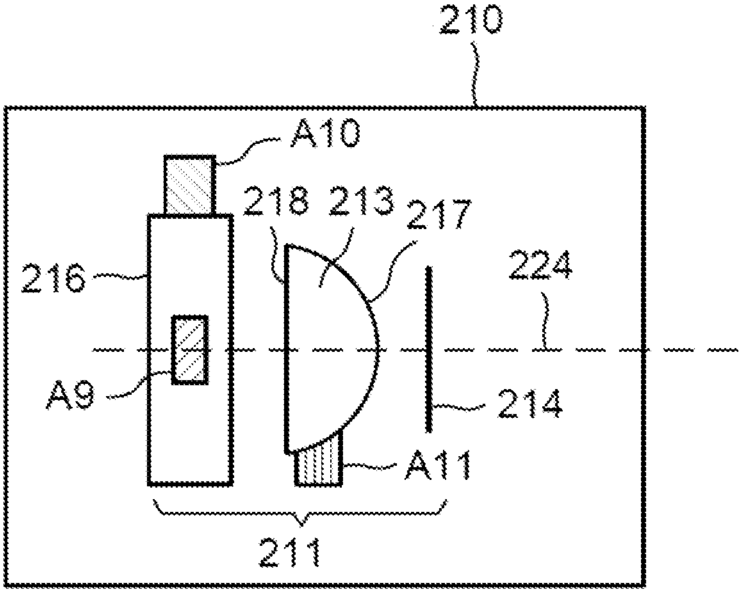
FIG. 13 shows a variation of a vehicle headlight disclosed in DE 10 2020 119 939 A1.

FIG. 13 shows a headlight or vehicle headlight 210 with an optical system 211 comprising a light source configured as an illumination matrix 216, a lens 213 configured as a first objective lens, and a diaphragm whose opening is denoted by reference numeral 214. The optical axis of the vehicle headlight is denoted by reference numeral 224. The lens 213 includes an optically effective light exit surface 217 and an optically effective light entrance surface 218. Light emitted from the illumination matrix 216 can enter the lens 213 through the optically effective light entrance surface 218 and leave this lens 213 through the light exit surface 217. The light emitted from the lens 213 through the light exit surface 217 is then focused through the diaphragm 214 of a diaphragm not shown in detail to produce an image of the headlight or vehicle headlight 210 as an illumination pattern not shown in detail. Alternatively, the optical system may comprise further lenses and/or further diaphragms. In this case, the lenses are made of glass or of plastic or of glass and plastic. The headlight or vehicle headlight 210 includes further elements such as a housing, brackets and mountings, which are not shown in detail. In addition, the headlight or vehicle headlight 210, like the headlight or vehicle headlight 10, is connected to a controller that is not shown in more detail, which may be configured like the control system 3 according to FIG. 2 and can be fed with corresponding signals from a diagnostic module, a data input for compliance with legal requirements, an infotainment system, and/or the environment sensor system.

The lens 213 configured as a first objective lens is movable in an oscillating and/or periodic manner by means of an actuator A11. The lens 213 configured as an objective lens thus forms an objective lens in the sense of the claims, which can be moved in an oscillating manner by means of the actuator A11.

The illumination matrix 216 can be moved oscillating in y-orientation by means of a (y-oriented) actuator A9 and oscillating in x-orientation by means of an (x-oriented) actuator A10. The actuators A9 and A10 are data-connected to the control system, which is not shown in more detail. The illumination matrix 216 is shown schematically in sections in FIG. 14, where reference signs PX11, PX12, PX13, PX14, PX21, PX22, PX23, PX24, PX31, PX32, PX33, PX34, PX41, PX42, PX43 and PX44 denote individually controllable illumination pixels of the illumination matrix 216.

In one embodiment, the oscillating movement of the illumination matrix 216 is intended to achieve that the distances between the illumination pixels are (barely) perceptible to the human eye. For this purpose, the (y-oriented) actuator A9 is controlled in such a way that the amplitude of the periodic movement of the illumination matrix 216 generated by means of the actuator A9 is at least $\Delta PXy/2$, for example at least $\Delta PXy$). In addition, the (x-oriented) actuator A10 is controlled in such a way that the amplitude of the periodic movement of the illumination matrix 216 generated by means of the actuator A10 is at least $\Delta PXx/2$, for example at least $\Delta PXx$. Here, $\Delta PXx$ denotes the or a distance between two illumination pixels in x-orientation and $\Delta PXy$ denotes the or a distance between two illumination pixels in y-orientation. The frequency of the oscillation is selected so that the oscillation cannot be perceived as an independent movement in the illumination pattern, e.g. greater than 25 Hz.

If the diagnostic module DIA detects that an illumination pixel has failed, the periodic movement of the illumination matrix 216 generated by the actuators A9 and A10 is adjusted accordingly. For example, if it has been detected that the illumination pixel PX22 has failed, the actuators A9 and A10 are controlled such that the illumination matrix is periodically moved such that a defective illumination pixel is not perceptible to the human eye. The amplitude of the periodic deflection is at least $(KLx+\Delta PXx)/2$ and/or at least $(KLy+\Delta PXy)/2$, for example at least $(KLx+\Delta PXx)$ or at least $(KLy+\Delta PXy)$. Here, KLx denotes the or an edge length of an illumination pixel in x orientation, KLy denotes the or an edge length of an illumination pixel in y orientation, $\Delta PXx$ denotes the or a distance between two illumination pixels in x orientation, and $\Delta PXy$ denotes the or a distance between two illumination pixels in y orientation. In addition, the light output INT of the illumination pixels PX12, PX21, PX23, and PX32 is increased by 10% to 15%.

In another embodiment, the amplitude of the actuators A9 and/or A10 may be selected such that individual illumination pixels of the illumination matrix appear at spatially separated locations in the illumination pattern so that a virtual increase in the number of imaged illumination pixels is achievable.

In another embodiment, however, the amplitude of the periodic motion may be 0.1 to 10 times the edge length KLx of an illumination pixel in x-orientation and or 0.1 to 10 times the edge length KLy of an illumination pixel in y-orientation.

In another embodiment, it can be provided that groups of illumination pixels of the illumination matrix are individually movable in an oscillating manner in orientation x and/or in orientation y by means of an actuator not shown in more detail. For this purpose, for example according to FIG. 14, a first group comprising the illumination pixels PX11, PX12, PX13 and PX14, PX21, PX22, PX23 and PX24 is moved in an oscillating manner with a first amplitude by means of a first actuator and a second group comprising the illumination pixels PX31, PX32, PX33, PX34, PX41, PX42, PX43, PX44 is moved in an oscillating manner with a second amplitude by means of a second actuator. The intensities of the illumination pixels of the first group of illumination pixels and the second group of illumination pixels are matched to each other by means of the control system in such a way that, for example, the point of the exclamation mark according to FIG. 4B can be imaged.

In one embodiment, it may be provided that the spacing of two illumination pixels is greater than the extent of the two illumination pixels. In this way, the thermal load of the illumination matrix can be reduced.

Figure 15:
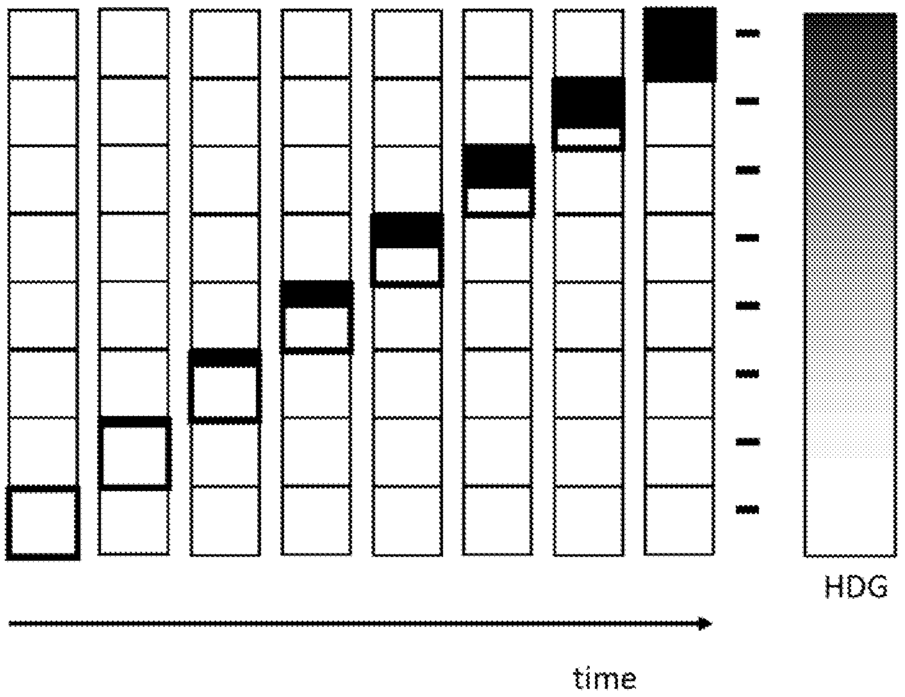
FIG. 15 shows an embodiment example of a method for generating a bright-dark-boundary with a predetermined gradient by means of illumination pixels of an illumination matrix that can be switched on and off.

FIG. 15 shows a section of an illumination matrix, such as illumination matrix 534, 4611 or 4611'. The section shows 8 superimposed illumination pixels, shown on the left of FIG. 15 as a column of 8 boxes. The virtual grid includes regularly spaced grid elements implemented by small horizontal strokes represented between the section of the illumination matrix and the illumination pattern depicting a bright-dark-boundary with a gradient.

The considered illumination pixel has a more strongly drawn border. The considered illumination pixel is movable by means of at least one of the actuators Ax, Ay or Az in such a way that it is movable along the time beam symbolized by the arrow with the label "time" from the bottom in FIG. 15 to the top in FIG. 15. The illumination pixel with the more strongly drawn border thus covers a certain distance along a straight line within a certain period of time, which corresponds approximately to the length of 8 illumination pixels. In addition, the illumination pixel under consideration can be switched on and off, emitting light of a predetermined brightness and/or intensity when switched on.

In the area of the outlined considered illumination pixel, a white fill marks the first portion of a time duration in which the illumination pixel is on, and the black fill marks the second portion of a time duration in which the illumination pixel is off. The first portion of the time duration and the second portion of the time duration add up to a particular time duration. This particular time duration is the time duration in which the considered illumination pixel overlaps a particular virtual grid element.

By superimposing a plurality of individual illumination pixels with virtual raster elements in the same way as shown for a selected illumination pixel in FIG. 15, an illumination pattern can be displayed that has a bright-dark-boundary (HDG) with a relatively small gradient, which is shown on the right in FIG. 15. The vehicle headlight is thus in illumination mode.

Figure 16:
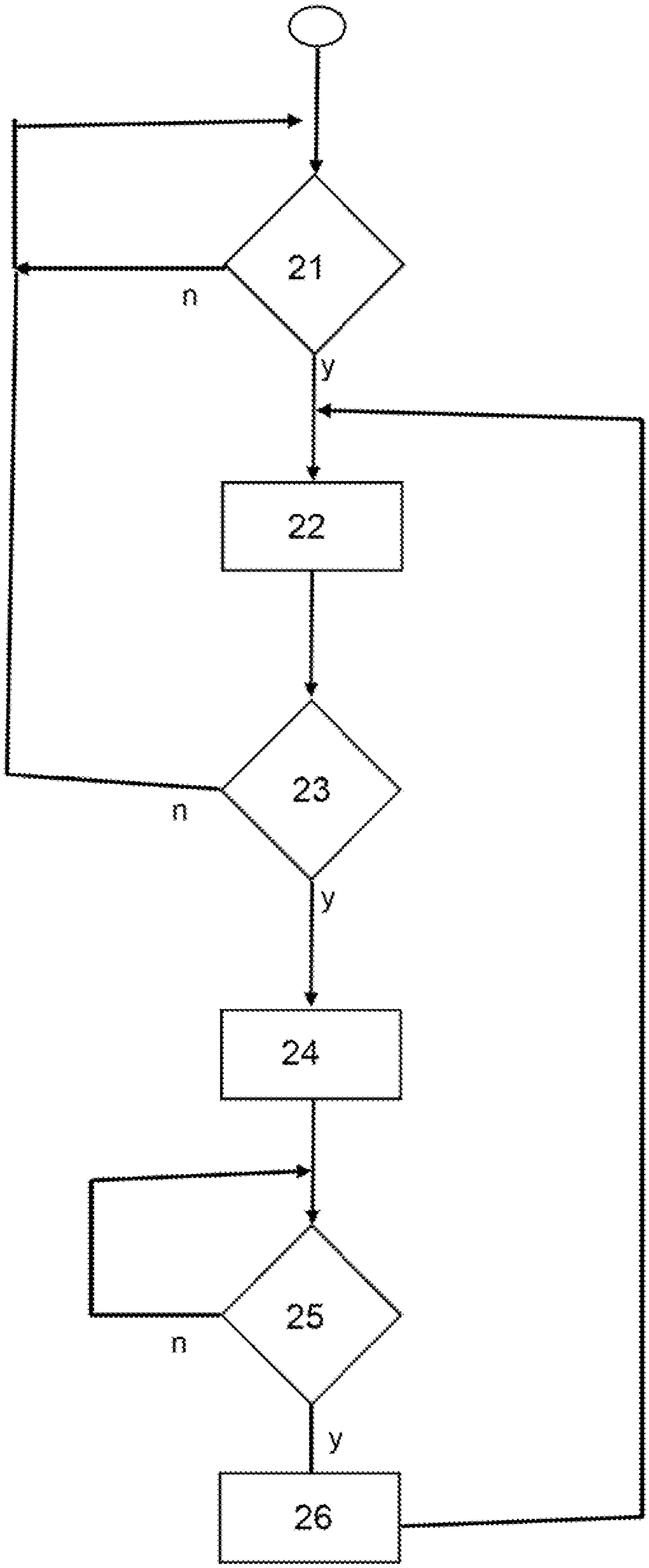
FIG. 16 shows an embodiment example of a method for operating a vehicle headlight.

FIG. 16 shows a schematic sequence for operating a vehicle headlight 10, which can be in two different modes when switched on, the illumination mode and the information mode. A query 21 is first made as to whether the vehicle headlight 10 is to be adjusted. If this is to be done, then in a step 22 the vehicle headlight 10 is set to the illumination mode. For this purpose, an oscillation of the optical elements (for example, a lens and/or a reflector) influencing the beam path of the generated light and/or of the light source formed as an illumination matrix is started and, at the same time, the light source is switched on to generate an illumination pattern. The illumination pattern is, for example, a bright-dark-boundary with a gradient, as shown in FIG. 4. A query 23 follows as to whether the change from illumination mode to information mode is desired. If this is to be done, this is followed in a step 24 by the switching off of the illumination pixels relating to the information and the switching off of the oscillation of the optical elements affecting the beam path of the light. The vehicle headlight 10 is now in the information mode. The illumination pixels relating to the information are, for example, a first group of illumination pixels provided as a group to project a "!" onto the road or, for example, a second group of illumination pixels provided as a group to project an "80" onto the road, see FIG. 4B and FIG. 4A. This is followed by a query 25 as to whether the information mode is to be terminated. If the information mode is to be terminated, the query 25 is followed by a step 26 in which the switching off of the illumination pixels relating to the imaged information is terminated. The step 26 is followed by the step 22. The described procedure degrades for a short period of time the quality of the bright-dark-boundary in favor of a more contrasty image of an information.

As an alternative to the two-mode operation of the vehicle headlight 10 described in FIG. 16, the vehicle headlight 10 may be operated to adopt more than two modes.

The elements in the figures are drawn with simplicity and clarity in mind, and not necessarily to scale. For example, the scales of some elements are exaggerated relative to other elements to enhance understanding of the embodiments of the present disclosure.

According to the above disclosure, groups of illumination pixels of an illumination matrix can be moved in an oscillating and/or periodic manner by means of actuators and/or, at the same time, at least one objective lens or one objective can be moved in an oscillating and/or periodic manner by means of actuators and, at the same time, an opening of a diaphragm not shown in greater detail can be moved in a deformable and/or periodic and/or oscillating manner by means of actuators. The movements brought about by means of the actuators can thereby map a desired illumination pattern on the roadway in front of the motor vehicle and/or in the vicinity of the motor vehicle as a function of the signals supplied to the control system 3. This means that faulty illumination pixels can be compensated for, imaging errors caused by dark areas between the illumination pixels can be avoided, and a virtual increase in the number of illumination pixels of the illumination matrix is possible.

The foregoing disclosure enables the (situation-dependent and/or dynamic) adjustment of the resolution of the vehicle headlight, the enabling or restriction of functions of the vehicle headlight by the control system, and the compensation of failed illumination pixels of the light source configured as an illumination matrix.

The present disclosure enables an optical system for a vehicle headlight to map a light distribution onto the environment of the vehicle. In this regard, the environment of the vehicle may relate to the area in front of the vehicle, for example, the road or lane on which the vehicle is located.

The optical system can be designed in such a way that the light of a segmented light source (for example LED illumination pixels with an average size of about 50 μm×50 μm) fulfills both an illumination task (e.g. bright-dark-boundary) and an information task (projection of, for example, time-variant symbols).

LIST OF REFERENCE SIGNS

1 motor vehicle
3 control system
5, 5', 5A, 5B illumination module
vehicle headlight
Ax x-oriented actuator
Ay y-oriented actuator
Az z-oriented actuator
DIA diagnostic module
G* target value of the gradient
INFO information module or infotainment system
INT light intensity of the illumination pixels
KLx edge length of an illumination pixel in x-orientation
KLy edge length of an illumination pixel in y-orientation
LEX data input for the implementation of legal requirements
OSZx control signal for x-oriented actuator
OSZy control signal for y-oriented actuator
OSZz control signal for z-oriented actuator
PX11, PX12 individually controllable illumination pixel of an illumination matrix
PX13, PX14 individually controllable illumination pixel of an illumination matrix
PX21, PX22 individually controllable illumination pixel of an illumination matrix
PX23, PX24 individually controllable illumination pixel of an illumination matrix
PX31, PX32 individually controllable illumination pixel of an illumination matrix
PX33, PX34 individually controllable illumination pixel of an illumination matrix
PX41, PX42 individually controllable illumination pixel of an illumination matrix
PX43, PX44 individually controllable illumination pixel of an illumination matrix
UG environmental sensor system
ΔPXx distance between two illumination pixels in x-orientation
ΔPXy distance between two illumination pixels in y-orientation
31, 41 opening of a diaphragm
32, 33, 34,
42, 43,
44, 51, 52 objective lens
36, 46, 46', 53 illumination lens
463 support shoulder
464, 464' air gap
465 centering surface
466, 466' lens edge
361, 461, 461' illumination arrangement
4612, 4612' carrier
467 seal
468 recess
469 dust filter element
50', 50A, 50B objective
511, 521, 531 convex curved surface
512, 522 plane area
516, 526 lens edge
533 anti-reflection
534, 4611, 4611' illumination matrix
535 heatsink
536, 360, 460, 460' lens body
555 optical axis
81 reference area
82 camera
83 database
84 test module
A1, A2, A3, A4, A5,
A6, A7, A8, A9, A10,
A11 actuator
D, d1, d2 distance
L5 illumination pattern
L51 dazzled areas
L52 dimmed areas
L53 curve light
210 headlight
211 optical system
213 first lens
214 opening of a diaphragm
216 illumination matrix
217 light exit surface
218 light entrance surface
224 optical axis

The invention claimed is:

1. A method for operating a motor vehicle having an environment sensor system and having a vehicle headlight, the vehicle headlight comprising an objective with at least one objective lens, and an illumination matrix with a plurality of independently controllable illumination pixels, the method comprising:

obtaining signals from the environment sensor system;

generating a time-variant illumination pattern depending on the signals from the environment sensor system by means of the illumination matrix, the illumination pattern comprising a bright-dark boundary having a gradient;

periodically deflecting the illumination matrix in terms of an oscillating movement; and imaging the illumination pattern by means of the objective onto a road in front of the motor vehicle.

2. The method of claim 1, wherein an intensity of the light output of an illumination pixel of the illumination matrix is dependent on a predetermined target value of the gradient and on the position of the illumination pixel of the illumination matrix.

3. The method of claim 2, wherein a time duration of the light output of an illumination pixel of the illumination of matrix is dependent on a predetermined target value of the gradient and on the position of the illumination pixel the illumination matrix.

4. The method of claim 2, wherein a switch-on time of an illumination pixel of the illumination matrix is dependent on a predetermined target value of the gradient and on the position of the illumination pixel of the illumination matrix.

5. The method of claim 4, wherein the switch-on time of the of the illumination pixel is adjusted in dependence on the target value of the light intensity of a virtual grid element.

6. The method of claim 1, wherein a time duration of the light output of an illumination pixel of the illumination of matrix is dependent on a predetermined target value of the gradient and on the position of the illumination pixel the illumination matrix.

7. The method of claim 1, wherein a switch-on time of an illumination pixel of a group of illumination pixels of the illumination matrix is dependent on a predetermined target value of the gradient and on the position of the illumination pixel of the group of illumination pixels of the illumination matrix.

8. The method of claim 7, the method further comprising:
periodically deflecting the illumination matrix in terms of an oscillating movement in an x-orientation; and
periodically deflecting the illumination matrix in terms of an oscillating movement in an y-orientation, wherein the y-orientation is oriented orthogonal to the x-orientation; wherein the y-orientation is further oriented orthogonal to a z-orientation, and wherein the x-orientation is further oriented orthogonal to the z-orientation wherein the z-orientation is an orientation parallel to or along an optical axis of the objective.

9. The method of claim 7, the method further comprising:
periodically deflecting the illumination matrix in terms of an oscillating movement in an x-orientation; and
periodically deflecting the illumination matrix in terms of an oscillating movement in an z-orientation, wherein the x-orientation is oriented orthogonal to the z-orientation, and wherein the z-orientation is an orientation parallel to or along an optical axis of the objective.

10. The method of claim 1, the method further comprising:
adjusting the gradient by means of a switch-on time of an illumination pixel of a group of illumination pixels of the illumination matrix.

11. The method of claim 1, wherein the switch-on time of at least one illumination pixel is adjusted in dependence on the target value of the light intensity of a virtual grid element and the time duration of the spatial overlap of the illumination pixel and the virtual grid element.

12. The method of claim 1, the method further comprising:
adjusting the gradient by means of the oscillating movement of a group of illumination pixels of the illumination matrix based on a virtual grid comprising a plurality of virtual grid elements, wherein the intensity of light output of at least one illumination pixel and a switch-on time of the at least one illumination pixel is adjusted in dependence on the target value of the light intensity of a virtual grid element and the time duration of the spatial overlap of the at least one illumination pixel and the virtual grid element.

13. The method of claim 1, the method further comprising:
switching between an illumination mode and an information mode, the illumination mode having a first gradient and the information mode having a second gradient, wherein the first gradient is smaller than the second gradient.

14. The method of claim 1, the method further comprising:
switching between an illumination mode and an information mode, the illumination mode having a first gradient and the information mode having a second gradient, wherein the first gradient is smaller than the second gradient, wherein a comparatively larger gradient is intended to be a gradient in which the light intensity of the imaged illumination pattern transitions from bright to dark in a comparatively smaller range.

15. The method of claim 1, the method further comprising:
periodically deflecting the illumination matrix in terms of an oscillating movement in an x-orientation; and
periodically deflecting the illumination matrix in terms of an oscillating movement in an y-orientation, wherein the y-orientation is oriented orthogonal to the x-orientation.

16. The method of claim 1, the method further comprising:
periodically deflecting the illumination matrix in terms of an oscillating movement in an x-orientation; and
periodically deflecting the illumination matrix in terms of an oscillating movement in an y-orientation, wherein the y-orientation is oriented orthogonal to the x-orientation; wherein the y-orientation is further oriented orthogonal to a z-orientation, and wherein the x-orientation is further oriented orthogonal to the z-orientation wherein the z-orientation is an orientation parallel to or along an optical axis of the objective.

17. The method of claim 16, the method further comprising:
periodically deflecting the illumination matrix in terms of an oscillating movement in the z-orientation.

18. The method of claim 1, the method further comprising:
periodically deflecting the illumination matrix in terms of an oscillating movement in an x-orientation; and
periodically deflecting the objective or a lens of the objective in terms of an oscillating movement in an y-orientation, wherein the y-orientation is oriented orthogonal to the x-orientation; wherein the y-orientation is further oriented orthogonal to a z-orientation, and wherein the x-orientation is further oriented orthogonal to the z-orientation wherein the z-orientation is an orientation parallel to or along an optical axis of the objective.

19. A method for operating a motor vehicle having a vehicle headlight, the vehicle headlight comprising at least one objective lens and an illumination lens, the illumination lens comprising a lens body of transparent material having at least one light entrance surface and at least one light exit surface, the illumination lens further comprising an illumination arrangement comprising a carrier on which an illumination matrix with a plurality of independently controllable illumination pixels is arranged, an air gap being provided between the illumination matrix and the light entrance surface of the lens body, the illumination matrix being connected to the lens body of the illumination lens via at least one x-oriented actuator and via at least one y-oriented actuator, the method comprising:
irradiating light into the light entrance surface of the lens body which emerges from the light exit surface of the lens body,
generating a time-variant illumination pattern by means of the illumination matrix;
periodically deflecting the illumination matrix in terms of an oscillating movement in an x-orientation;
periodically deflecting the illumination matrix in terms of an oscillating movement in an y-orientation, wherein the y-orientation is oriented orthogonal to the x-orientation, wherein the y-orientation is further oriented orthogonal to a z-orientation, and wherein the x-orientation is further oriented orthogonal to the z-orientation wherein the z-orientation is an orientation parallel to or along an optical axis of the objective lens; and
imaging the illumination pattern by means of the lens body of the illumination lens and the at least one objective lens onto the road in front of the motor vehicle.

20. The method of claim 19, the illumination pattern comprising a bright-dark boundary having a gradient, wherein a switch-on time of the light output of an illumination pixel of the illumination matrix is dependent on a predetermined target value of the gradient and on the position of the illumination pixel of the illumination matrix.

21. The method of claim 20, the method further comprising:

periodically deflecting the objective lens in terms of an oscillating movement in an x-orientation; and periodically deflecting the objective lens in terms of an oscillating movement in an y-orientation, wherein the y-orientation is oriented orthogonal to the x-orientation; wherein the y-orientation is further oriented orthogonal to a z-orientation, and wherein the x-orientation is further oriented orthogonal to the z-orientation wherein the z-orientation is an orientation parallel to or along an optical axis of the objective lens.

22. The method of claim 19, the illumination pattern comprising a bright-dark boundary having a gradient, wherein the gradient is adjusted by means of a switch-on time of an illumination pixel of a group of illumination pixels of the illumination matrix.

* * * * *